(12) United States Patent
Wang

(10) Patent No.: US 9,725,178 B2
(45) Date of Patent: Aug. 8, 2017

(54) AIRFLOW MODIFICATION APPARATUS AND METHOD

(71) Applicant: Raymond R M Wang, Vancouver (CA)

(72) Inventor: Raymond R M Wang, Vancouver (CA)

(*) Notice: Subject to any disclaimer, the term of this patent is extended or adjusted under 35 U.S.C. 154(b) by 0 days.

(21) Appl. No.: 15/148,875

(22) Filed: May 6, 2016

(65) Prior Publication Data
US 2016/0325839 A1 Nov. 10, 2016

Related U.S. Application Data

(60) Provisional application No. 62/158,889, filed on May 8, 2015.

(51) Int. Cl.
*B64D 13/00* (2006.01)
*B60H 1/34* (2006.01)
*B64D 13/06* (2006.01)

(52) U.S. Cl.
CPC ........... *B64D 13/00* (2013.01); *B60H 1/3407* (2013.01); *B60H 1/3414* (2013.01); *B64D 2013/003* (2013.01); *B64D 2013/0651* (2013.01); *F24F 2221/28* (2013.01); *Y02T 50/44* (2013.01); *Y02T 50/56* (2013.01)

(58) Field of Classification Search
CPC B64D 13/00; B64D 13/06; B64D 2013/0603; B64D 13/02; B64D 2013/003; B64D 13/006; B60H 1/3442
USPC ............ 454/76–77, 143, 152, 278, 270, 292
See application file for complete search history.

(56) References Cited

U.S. PATENT DOCUMENTS

| | | | | |
|---|---|---|---|---|
| 4,742,760 A * | 5/1988 | Horstman | ............. | B64D 13/00 244/118.5 |
| 5,695,396 A * | 12/1997 | Markwart | ............. | B64D 13/00 454/71 |
| 6,024,639 A | 2/2000 | Scherer et al. | | |
| 6,802,361 B2 * | 10/2004 | Hatanaka | ............. | F24F 1/0011 165/53 |

(Continued)

OTHER PUBLICATIONS

Mohr et al, "Evidence for airborne infectious disease transmission in public ground transport—a literature review," Robert Koch Institute, Department of Infectious Disease Epidemiology, taken from www.eurosurveillance.org/ViewArticle.aspx?ArticleId=20255, Aug. 30, 2012, 11 pages.

(Continued)

*Primary Examiner* — Stevens B McAllister
*Assistant Examiner* — Ko-Wei Lin
(74) *Attorney, Agent, or Firm* — Foley Hoag LLP; Rajesh Vallabh

(57) ABSTRACT

An apparatus for modifying aircraft cabin airflow includes a redirector configured to receive an airflow from an inlet of an aircraft cabin. The redirector is configured to downwardly redirect at least a portion of the airflow. In one embodiment, the redirector includes a dividing portion configured to be oriented generally parallel to the airflow received at the redirector from the cabin inlet, and further includes a redirecting portion configured to be oriented in a generally downward direction. In another embodiment, the redirector includes an elongated protrusion configured to be positioned on a ceiling of the aircraft cabin.

20 Claims, 13 Drawing Sheets

(56) References Cited

U.S. PATENT DOCUMENTS

| | | | | |
|---|---|---|---|---|
| 6,902,474 | B2* | 6/2005 | Gehring | B60H 1/3414 454/152 |
| 6,910,960 | B2 | 6/2005 | Reich et al. | |
| 7,037,187 | B2* | 5/2006 | Butera | B60H 1/00664 237/12.3 B |
| 9,011,216 | B1 | 4/2015 | Al-Alusi et al. | |
| 2009/0061754 | A1 | 3/2009 | Hlavka et al. | |
| 2009/0311951 | A1 | 12/2009 | Walkinshaw | |
| 2011/0028081 | A1* | 2/2011 | Hopkins | F24F 11/043 454/259 |

OTHER PUBLICATIONS

Gupta et al., "Transport of expiratory droplets in an aircraft cabin," Indoor Air, vol. 21, Issue 1, Jun. 9, 2010, 3-11, taken from engineering.purdue.edu/~yanchen/paper/2011-2.pdf, 19 pages.

Zhang et al., "Novel Air Distribution Systems for Commercial Aircraft Cabins," Building and Environment vol. 42, Issue 4, Mar. 2007, 1675-1684, taken from engineering.purdue.edu/~yanchen/paper/2007-3.pdf, 17 pages.

Bai et al., "Numerical Simulation on Smoke Diffusion in Aircraft Cabin," Aeronautical Computing Technique, vol. 44, Issue 5, Sep. 2014, 1-4, 4 pages, China Aviation Industry, Xi'an, Shaanxi Province, China.

Centers for Disease Control and Prevention "Infection Control Guidelines for Cabin Crew Members on Commercial Aircraft," taken from www.cdc.gov/quarantine/air/managing-sicktravelers/commercial-aircraft/infection-control-cabin-crew.html, Mar. 10, 2014, 5 pages.

Centers for Disease Control and Prevention, "What is contact tracing?", brochure taken from www.cdc.gov/vhf/ebola/pdf/contact-tracing.pdf, 2014, 1 page.

Gupta et al., "Transport of expiratory droplets in an aircraft cabin," Indoor Air, vol. 21, Issue 1, Jun. 9, 2010, 3-11, taken from engineering.purdue.edu/-yanchen/paper/2011-2.pdf, 19 pages.

Illig et al., "Chapter 6 Conveyance & Transportation Issues: Air Travel," CDC Health Information for International Travel, taken from http://wwwnc.cdc.gov/travel/yellowbook/2016/conveyance-transportation-issues/air-travel, Jul. 10, 2015, 9 pages.

Lee et al., "Estimating the Global Economic Costs of SARS," Learning from SARS: Preparing for the Next Disease Outbreak—Workshop Summary, Institute of Medicine, Washington D.C., 2004, 92-109, 18 pages.

Martinez, Isidoro, "Aircraft Environmental Control," Madrid, 2014, 31 pages.

Mohr et al, "Evidence for airborne infectious disease transmission in public ground transport—a literature review,"Robert Koch Institute, Department of Infectious Disease Epidemiology, taken from www.eurosurveillance.org/ViewArticle.aspx?ArticleId=20255, Aug. 30, 2012, 11 pages.

Mu et al., "Numerical Simulation of Particulate Pollutants Transport in an Aircraft Cabin," Aeronautical Computing Technique, vol. 43, Issue 5, Sep. 2013, 61-64, 69, 5 pages, China Aviation Industry, Xi'an, Shaanxi Province, China.

Olsen et al, "Transmission of the Severe Acute Respiratory Syndrome on Aircraft," The New England Journal of Medicine, Dec. 18, 2003, Issue 349, 2416-2422, 7 pages, Massachusetts Medical Society.

Pavia, Andrew T., "Germs on a Plane: Aircraft, International Travel, and the Global Spread of Disease," The Journal of Infectious Diseases, Jan. 18, 2007, Issue 195, 621-622, 2 pages, Oxford University Press.

Zhang et al., "Novel Air Distribution Systems for Commercial Aircraft Cabins," Building and Environment vol. 42, Issue 4, Mar. 2007, 1675-1684, taken from engineering.purdue.edu/-yanchen/paper/2007-3.pdf, 17 pages.

European Search Report for EP16168552.4, dated Aug. 16, 2016.

Marienau, K. J., "Air Travel", [online] wwwnc.cdg.gov/travel/yellowbook/2014/chapter-6-conveyance-and-transportation-issues/air-travel. Aug. 1, 2013.

European Patent Office, European Search Report for EP Application No. 16168552.4, mailed Aug. 24, 2016, 7 pages.

\* cited by examiner

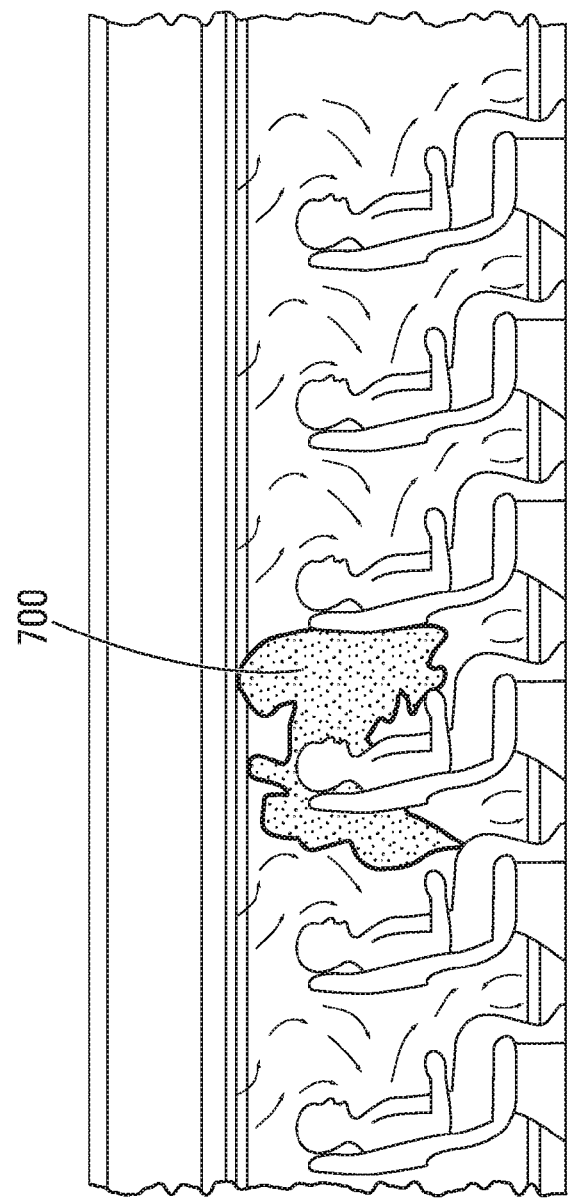
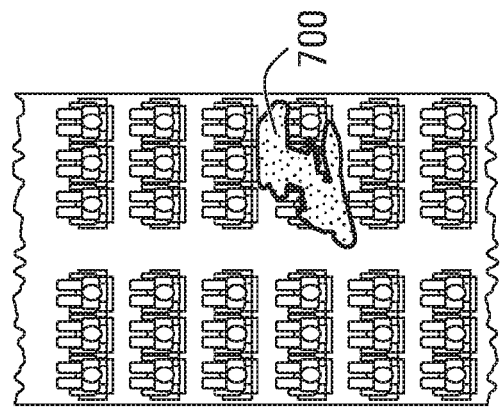
FIG. 7A
FIG. 7B

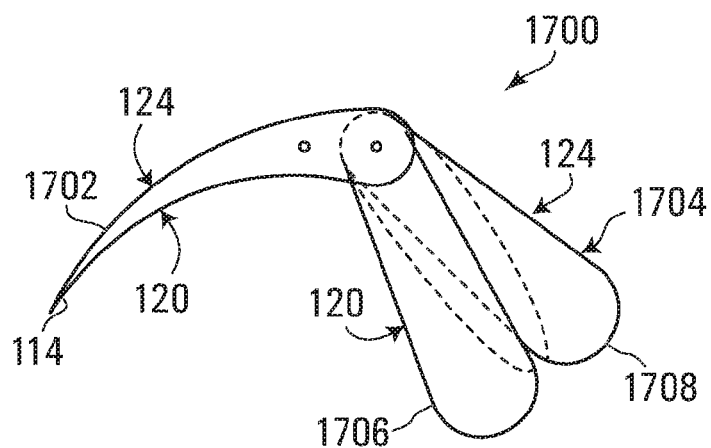
FIG. 17A
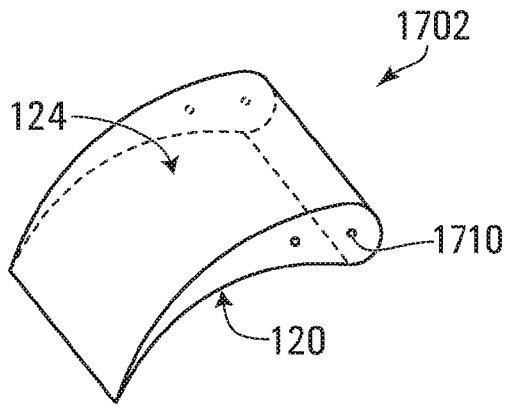
FIG. 17B
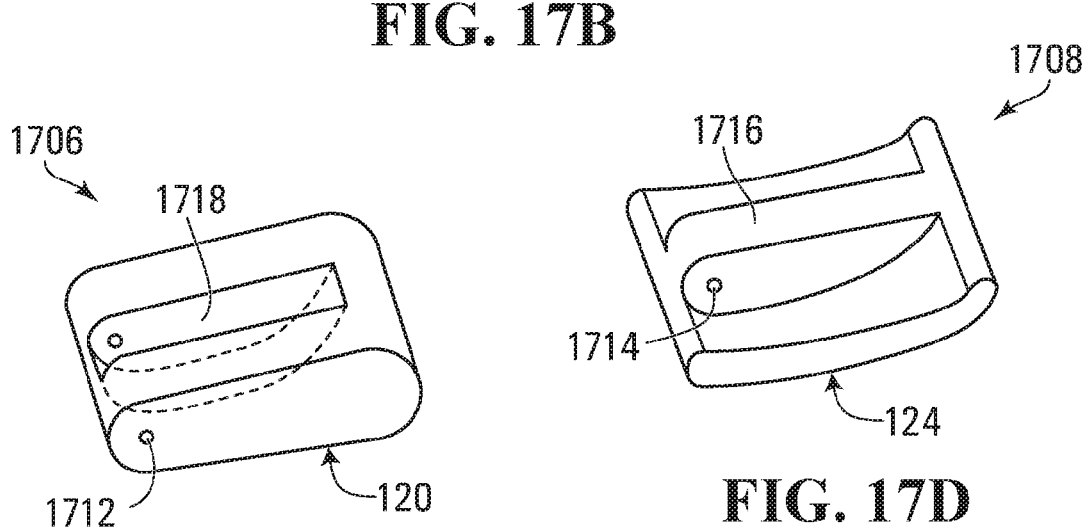
FIG. 17C
FIG. 17D

AIRFLOW MODIFICATION APPARATUS AND METHOD

CROSS REFERENCE TO RELATED APPLICATIONS

This application claims the benefit of U.S. Provisional Application No. 62/158,889 to Wang, filed May 8, 2015 and entitled "SYSTEM OF AIRCRAFT AIR CONDITIONING MODIFICATIONS TO ENHANCE CABIN AIRFLOW," which is hereby incorporated by reference in its entirety.

BACKGROUND OF THE INVENTION

1. Field of the Invention

The present disclosure relates to airflow modification. More particularly, illustrative embodiments relate to apparatus and methods for modifying aircraft cabin airflow. Other illustrative embodiments may relate to apparatus and methods for modifying airflow in other types of public transportation vehicles such as trains or buses, or in other enclosed spaces such as waiting rooms.

2. Description of the Related Art

Modern aircraft present a highly vulnerable environment for the transmission of airborne pathogens and disease. Particularly in light of recent Influenza and SARS epidemics, the current aircraft cabin environment causes concern for billions of air travelers worldwide, a figure predicted by the CDC to double within 20 years.[1] Isolated air in densely packed aircraft cabins serves as a vector for disease transmission via direct airborne and large droplet routes. Empirical investigations have consistently identified statistically significant correlations between disease contraction and air travel,[2, 3, 4] and government health researchers have marked the airplane cabin as especially vulnerable to transmitting tuberculosis, meningococcal disease, measles, and influenza.[5] Worsening matters, infected passengers incur widespread societal fear and large socioeconomic costs in providing treatment[6] and conducting contact tracing.[7]

Although most modern aircraft cabins are typically equipped with HEPA filters that are effective at removing over 99% of airborne pathogens, contaminated air must first be removed efficiently from the cabin to pass through these filters for pathogens to be removed. When a passenger sneezes in a conventional commercial aircraft cabin, mixing airflow patterns propagate the spread of pathogens throughout the cabin section,[8] causing pathogens to be inhaled by numerous other passengers before the contaminated air can be removed through outlet vents for cleaning by the HEPA cabin air filters of the Aircraft Environmental Control System for filtration and recirculation. Thus, for example, a single air passenger sick with the SARS virus was determined to have spread the virus to 22 other passengers on a single flight.[9]

Although some solutions to this problem have been proposed, they have not thus far proven to be viable.

For example, U.S. Pat. No. 6,910,961 to Niu discloses a personalized ventilation system integrated with a chair, for use in conjunction with building or vehicle ventilation systems. The chair has tubes and a nozzle configured to release air from the ventilation system very close to the nose and mouth of a person in the chair to prevent mixing with ambient air and to maximize the cooling and refreshing effect of the incoming conditioned air. However, this solution does not appear to be economically viable, as it would require a complete overhaul of the aircraft cabin interior, including the removal and replacement of all passenger seats and the installation of appropriate conduits to connect each seat to the aircraft's ventilation system. Such an extensive overhaul would require the aircraft to be taken out of service for months, resulting in too much lost revenue to permit an airline to adopt such a solution. This solution also presents ergonomic and aesthetic challenges for passengers, as the fresh air tubing placed in close proximity to the passenger's nose and mouth may hinder passenger comfort, and presents a risk of injury if the aircraft experiences turbulence or if the client moves suddenly after forgetting that an air intake tube is right beside their head.

As a further example, an under-floor displacement air distribution system has also been studied, involving the unconventional placement of some outlets at the top of the aircraft cabin and some inlets at the bottom of the cabin to produce a predominantly upward airflow, which is opposite to the generally downward airflow in conventional cabins which typically have outlets only near the floor and inlets only near the ceiling.[10] Such a system could, in theory, use human thermal plumes to expedite air exchange. However, it was concluded that the under-floor displacement air distribution system was not as effective at removing pathogens as a personalized ventilation system. Moreover, the under-floor displacement air distribution system is also economically unviable, requiring the aircraft to be taken out of service for potentially 1-2 months to install appropriate air ducting. In addition, inverting the airflow direction in this manner tends to present more unpleasant smells to passengers, such as foot odor and flatulence, for example.

Overhead gasper valves, although perhaps capable of supplying some additional fresh air to passengers, have not generally been effective in reducing pathogen propagation, and are commonly now offered only as an option, rather than a standard feature, to airlines purchasing newly manufactured aircraft.

Although the above discussion focuses on aircraft, other types of public transportation vehicles such as trains and buses for example, or other enclosed spaces, may also suffer from similar pathogen transmission problems.

BRIEF SUMMARY OF THE INVENTION

In one illustrative embodiment of the invention, an apparatus for modifying aircraft cabin airflow includes a redirector configured to receive an airflow from an air inlet of an aircraft cabin. The redirector is configured to downwardly redirect at least a portion of the airflow.

Advantageously, it has been found that such a redirector tends to significantly reduce airborne pathogen propagation within aircraft cabins. The redirector tends to redirect and stratify downward incoming flows of fresh air, resulting in significantly less mixing of fresh air with exhaled or used air before the airflows exit the cabin through outlets for subsequent conventional pathogen filtration. For example, it has been shown that in one embodiment, the redirector may reduce pathogen inhalation by up to 98%, and may increase the proportion of inhaled air that is fresh air by up to or even over 190% depending on seating position and airplane configuration.

In an illustrative embodiment, the redirector may be configured to divide the airflow into at least a first airflow portion flowing downwardly along one side of a redirector and a second airflow portion flowing along an opposite side of the redirector. More particularly, the redirector may be configured to divide the airflow into the first airflow portion, the second airflow portion and a third airflow portion, the second airflow portion flowing downwardly along the opposite side of the redirector, and the third airflow portion flowing along a ceiling of the cabin.

The apparatus may further include a second redirector, in which case the first and second redirectors may be respectively configured to receive first and second airflows from first and second respective air inlets at opposite sides of the cabin. In such an embodiment, the first and second redirectors are configured to divide each one of the first and second airflows into the first, second and third airflow portions, and to cause the third airflow portion of each one of the first and second airflows to collide with an opposing airflow that includes at least one of an airflow from a center air inlet of the cabin, and the third airflow portion of the other one of the first and second airflows.

The redirector may include a dividing portion configured to be oriented generally parallel to the airflow received at the redirector from the air inlet.

The redirector may further include a redirecting portion configured to be oriented in a generally downward direction.

The dividing portion may have a sharp upstream edge and the redirecting portion may have a rounded downstream edge.

The dividing portion and the redirecting portion may be configured to extend longitudinally over a length corresponding to a longitudinal length of the inlet.

The redirector may be transparent or translucent to visible light.

The redirector may be attachable to an existing aircraft.

At least one of the redirector and the redirecting portion may be pivotally adjustable to permit adjustment of an angle at which the redirecting portion downwardly directs the portion of the airflow.

The redirector may be resiliently attachable to the existing aircraft.

The redirector may include an elongated protrusion configured to be positioned on a ceiling of the aircraft cabin.

In another illustrative embodiment, an aircraft includes a plurality of redirectors as described herein, configured to receive a plurality of respective airflows from a plurality of respective air inlets. In such an embodiment, the aircraft further includes a plurality of air outlets located downwardly from the air inlets.

In another illustrative embodiment, a method of modifying aircraft cabin airflow includes receiving an airflow from an air inlet of an aircraft cabin, and downwardly redirecting at least a portion of the airflow.

Downwardly redirecting may include dividing the airflow into at least a first airflow portion flowing downwardly along one side of a redirector and a second airflow portion flowing along an opposite side of the redirector. For example, dividing may include dividing the airflow into the first airflow portion, the second airflow portion and a third airflow portion, the second airflow portion flowing downwardly along the opposite side of the redirector, and the third airflow portion flowing along a ceiling of the cabin.

Receiving the airflow may include receiving first and second airflows at first and second respective redirectors from first and second respective air inlets at opposite sides of the cabin. Dividing may include dividing each one of the first and second airflows into the first, second and third airflow portions, and causing the third airflow portion of each one of the first and second airflows to collide with an opposing airflow that includes at least one of an airflow from a center air inlet of the cabin, and the third airflow portion of the other one of the first and second airflows.

In another illustrative embodiment, an apparatus for modifying an airflow pattern in an enclosed space having upper air inlets and lower air outlets includes a redirector configured to receive an airflow from one of the upper air inlets of the enclosed space. The redirector is configured to downwardly redirect at least a portion of the airflow. The enclosed space may include one of a passenger compartment of a transportation vehicle (such as an aircraft, a bus or a train, for example), a public enclosed space, or a combination thereof.

Other aspects, features and advantages of illustrative embodiments of the present invention will become apparent to those ordinarily skilled in the art upon review of the following description of such embodiments in conjunction with the accompanying figures.

BRIEF DESCRIPTION OF THE DRAWINGS

In drawings which illustrate embodiments of the invention,

FIGS. 7A, 7B and 7C respectively show a side view, a top view and a front view of a simulated passenger sneeze in a conventional aircraft cabin;

FIG. 17A is a front elevation view of a redirector according to a third embodiment; and FIGS. 17B, 17C and 17D respectively show isometric views of a dividing portion, a first half of a redirecting portion and a second half of a redirecting portion, of the redirector shown in FIG. 17A.

DETAILED DESCRIPTION

Figure 5:
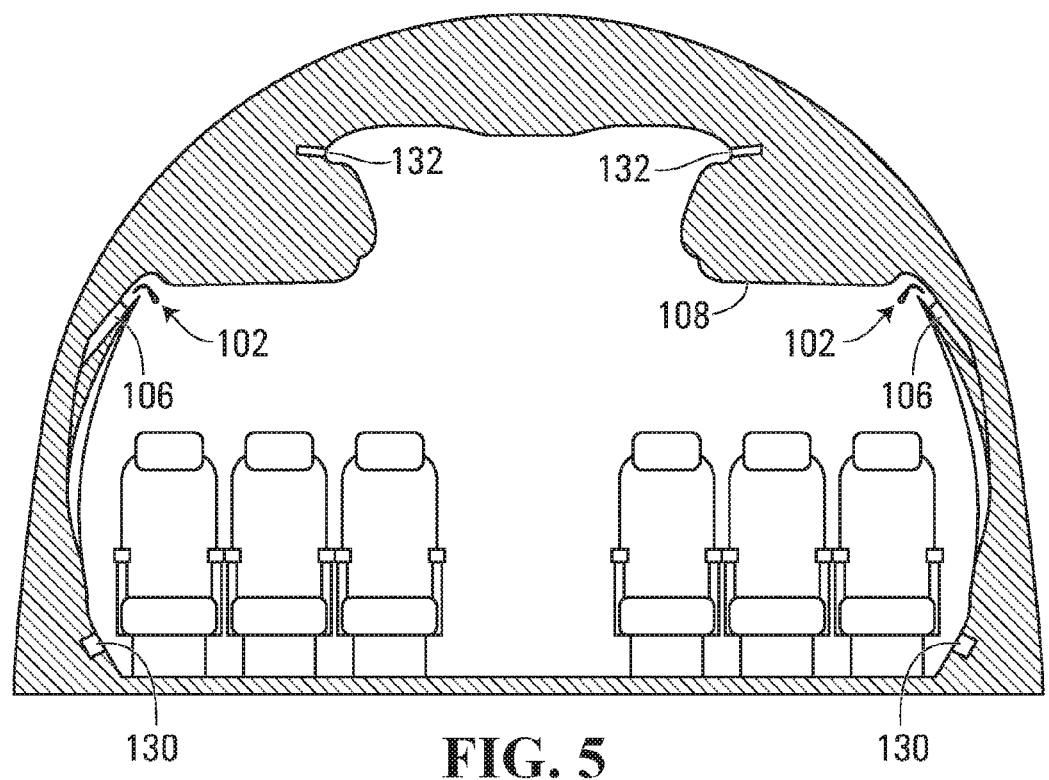
FIG. 5 is a partial cross-section of an aircraft cabin interior that has been modified by installing the apparatus of FIG. 1 proximate to an air inlet of the cabin.
Figure 6:
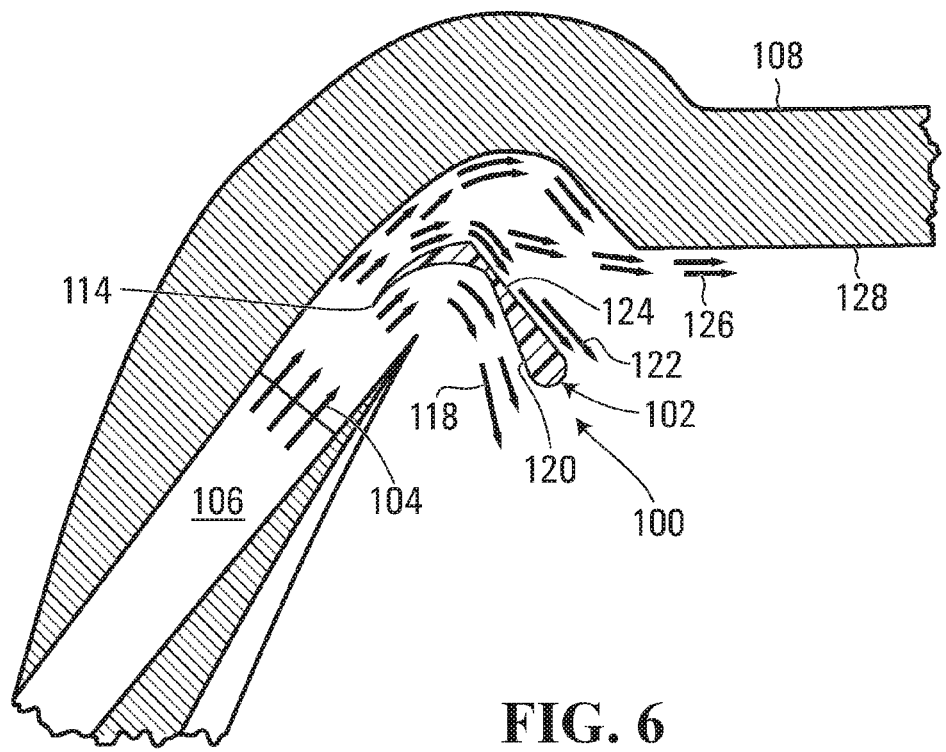
FIG. 6 is an enlarged detail view of an air inlet region of the aircraft cabin of FIG. 5 showing the apparatus of FIG. 1 proximate to an air inlet of the cabin.

Referring to FIGS. 1-6, an apparatus for modifying an airflow pattern in an enclosed space having upper air inlets and lower air outlets is shown generally at 100. In this embodiment, the enclosed space is an aircraft cabin, and thus the apparatus 100 of this embodiment is for modifying aircraft cabin airflow. FIGS. 1-4 show the apparatus 100 in isolation while FIGS. 5-6 show the apparatus 100 installed in an aircraft cabin 108.

Redirector

Figure 1:
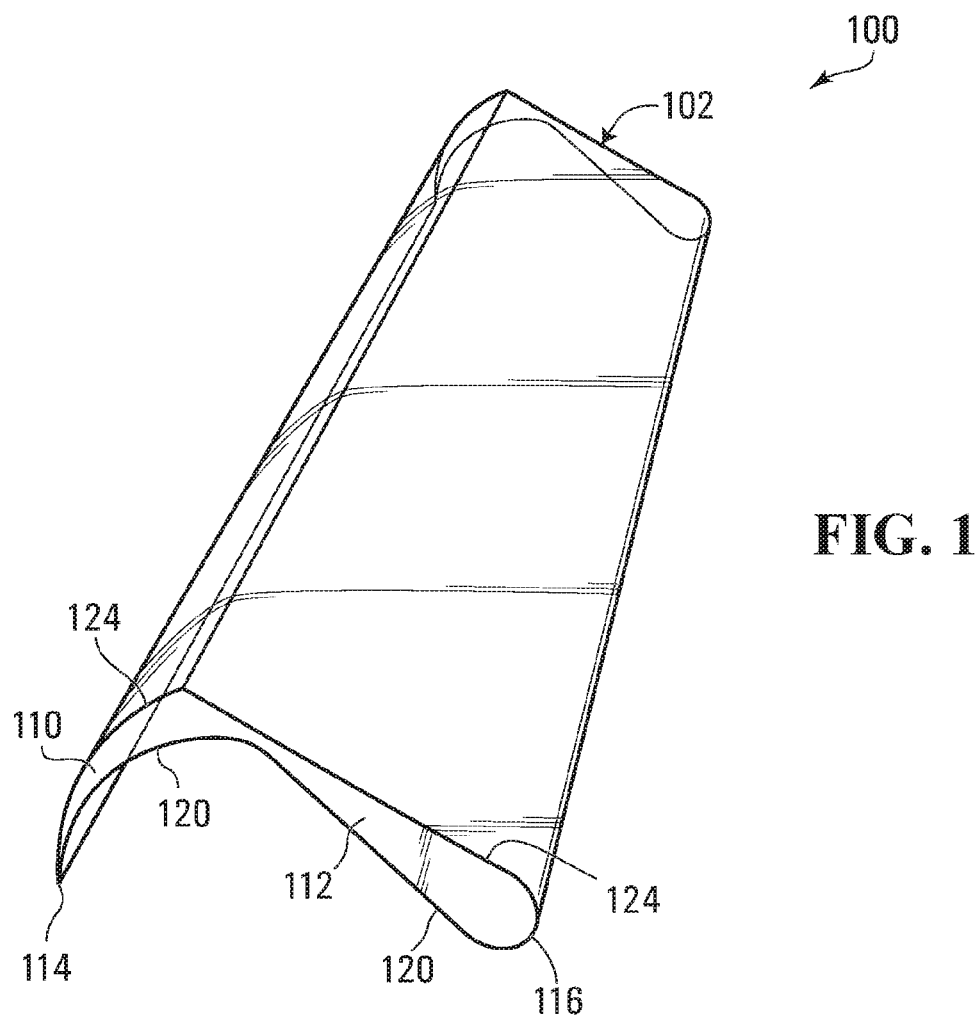
FIG. 1 is a top front perspective view of an apparatus for modifying aircraft cabin airflow according to a first embodiment of the invention.
Figure 2:
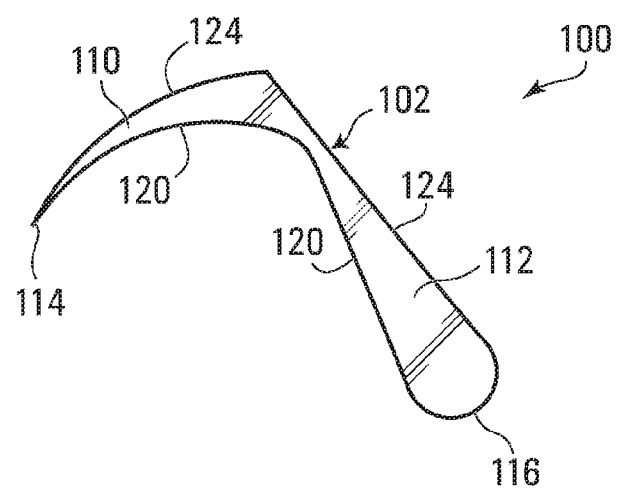
FIG. 2 is a front elevation view of the apparatus of FIG. 1, the rear elevation view being a mirror image thereof.

Referring to FIGS. 1, 2 and 6, in this embodiment the apparatus 100 includes a redirector 102 configured to receive an airflow 104 from an air inlet 106 of the aircraft cabin 108. In the present embodiment, the redirector 102 is further configured to downwardly redirect at least a portion of the airflow 104.

Referring to FIGS. 2 and 6, in this embodiment the redirector 102 includes a dividing portion 110 configured to be oriented generally parallel to the airflow 104 received at the redirector 102 from the cabin air inlet 106. Also in this embodiment, the redirector 102 further includes a redirecting portion 112 configured to be oriented in a generally downward direction. In this embodiment, the redirecting portion is positioned and oriented so that it redirects the incoming airflow toward targets of interest in the cabin, such as downwardly toward passenger seats or the boundaries therebetween, as discussed in greater detail in the Operation section below. Generally, the configuration and orientation of the redirecting portion are selected to cause the formation and stratification of downward airflows or air curtains that act as both a barrier for disease transmission and as a force to aid in the pushing of pathogens toward the outlet for filtration. Appropriate configurations and orientations can thus be selected to accommodate a wide variety of different aircraft cabins, or other transportation vehicles or spaces. In this embodiment, the redirecting portion 112 is at approximately a right angle to the dividing portion 110. Alternatively, the relative angle of the redirecting and dividing portions may vary according to the aircraft type and configuration.

In the present embodiment, the dividing portion 110 has a sharp upstream edge 114, and the redirecting portion 112 has a rounded downstream edge 116. In this embodiment, the dividing portion 110 and the redirecting portion 112 serve to divide the incoming airflow into multiple portions, resulting in stratification of the airflow, as discussed in greater detail below.

Referring to FIG. 2, in this embodiment the redirector 102 has generally curved upper and lower surfaces. More particularly, the redirector 102 has a lower surface 120 which is generally concave, and an upper surface 124 which is generally convex. More particularly still, in this embodiment the lower surface 120 is concave along the dividing portion 110 and the upper surface 124 is convex along the dividing portion 110, and both the curved upper and lower surfaces 124 and 120 transition to straight lines approximately where the dividing portion 110 transitions to the redirecting portion 112, with the straight lines continuing to diverge as they extend downstream along the redirecting portion 112, until the upper and lower surfaces once again curve into a semicircular shape at the rounded downstream edge 116 where the upper and lower surfaces meet.

Generally, the redirector 102 is preferably composed of a material that is: (a) light weight, for better fuel economy and ease of installation; (b) flame retardant for compliance with applicable aviation regulations; and (c) optically transparent or translucent to visible light, to avoid blocking light inside the cabin. To satisfy these criteria, in this embodiment the redirector 102 is composed of an optically transparent material such as polycarbonate or acrylic typically used for aircraft windows, and thus in this embodiment the redirector 102 is transparent to visible light. Alternatively, other materials may be substituted. In some embodiments, the redirector 102 may be hollow to further reduce its weight.

Installation

Advantageously, in this embodiment the redirector 102 is attachable to an existing aircraft, or more particularly, to the aircraft cabin 108 shown in FIG. 5. Various illustrative embodiments may be attachable to, for example, an aircraft side wall surface consistent with FIGS. 5-6 below, or to an aircraft ceiling consistent with FIGS. 13-14 below, or to any other suitable cabin surface.

Referring to FIGS. 5 and 6, in this embodiment, attached to the aircraft cabin 108 are a plurality of redirectors 102 configured to receive a plurality of respective airflows 104 from a plurality of respective air inlets 106, and the aircraft cabin 108 further includes a plurality of air outlets 130 located downwardly from the air inlets 106. More particularly, in this embodiment each air inlet section of the aircraft is equipped with its own respective redirector 102. Although inlet sizes may vary among aircraft, a typical aircraft usually has one longitudinally extending air inlet section for every two rows of passengers. Accordingly, in this embodiment, a plurality of redirectors 102 is installed on the starboard side of the aircraft and a second plurality of redirectors 102 is installed on the port side of the aircraft, with one redirector 102 being installed for every air inlet 106. For each one of the redirectors 102, the dividing portion 110 and the redirecting portion 112 are configured to extend longitudinally over a length almost equal to a longitudinal length of the air inlet 106, leaving a small clearance space at the forward and aft sides of the redirector 102 to allow the redirector 102 to fit within the inlet.

In some embodiments the redirector 102 may feature, for example, rounded forward and aft faces so as to better fit the contours of the cabin surface at the point of installation, depending on the type of aircraft to which the redirector 102 is being fitted.

In this embodiment, each redirector 102 is attached to the aircraft cabin by screws (not shown) extending in a longitudinal direction through radially extending portions of inlet sidewalls that define the longitudinal extent of each air inlet 106, and extending into the sides (forward and aft) of the redirector 102. Alternatively, other means for attaching the redirector 102 to the cabin 108 may be substituted. For example, the redirector may instead be secured to a ceiling 128 of the cabin 108 by two vertically extending screws, with an elongated washer or spacer separating the top of the redirector 102 from the ceiling of the cabin 108 to achieve the correct placement of the redirector 102 relative to the air inlet 106. (In this disclosure, the term, "ceiling 128" refers to the entire upper surface of the interior of the cabin 108, and thus includes both lower ceiling portions comprising the bottom surfaces of the overhead carry-on luggage compartments above the passenger seats, as well as a higher ceiling portion above the central aisle.) As a further example, other embodiments may employ attachment means other than screws, such as snap fits, pins or other fasteners, for example.

In either case, holes for the screws are preferably drilled into the redirector 102 to reduce the likelihood of cracking or otherwise damaging the redirector 102 during installation.

Figure 3:
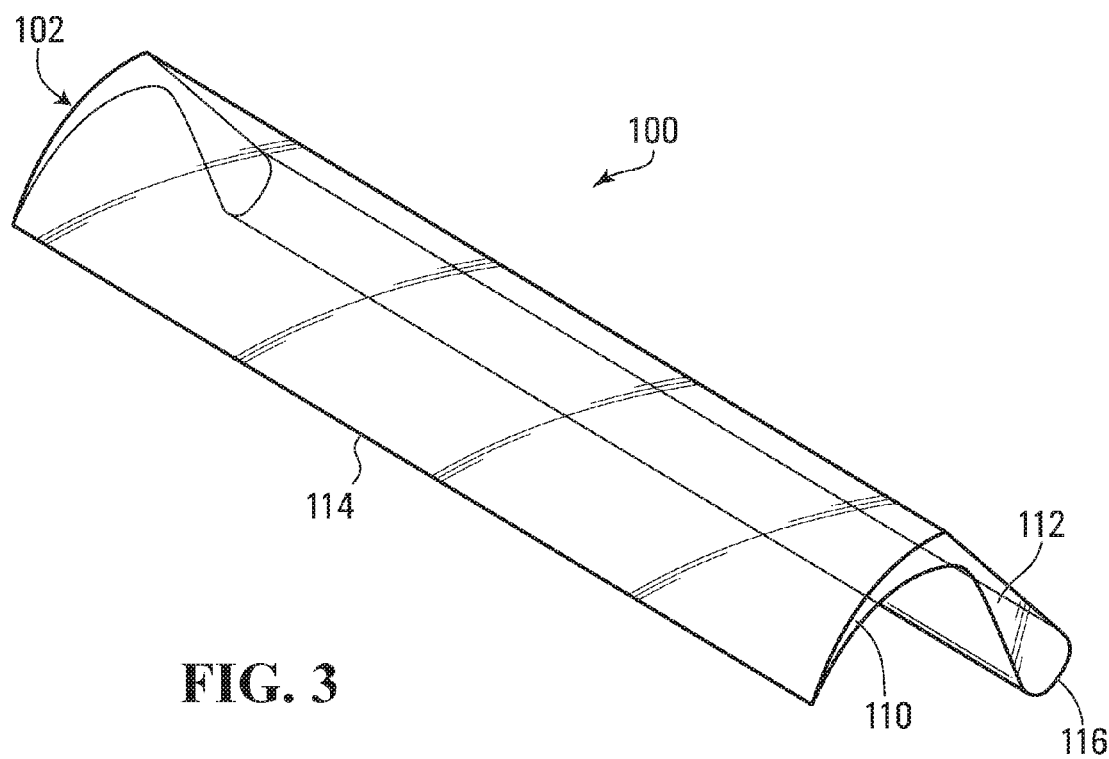
FIG. 3 is a left front isometric view of the apparatus of FIG. 1.
Figure 4:
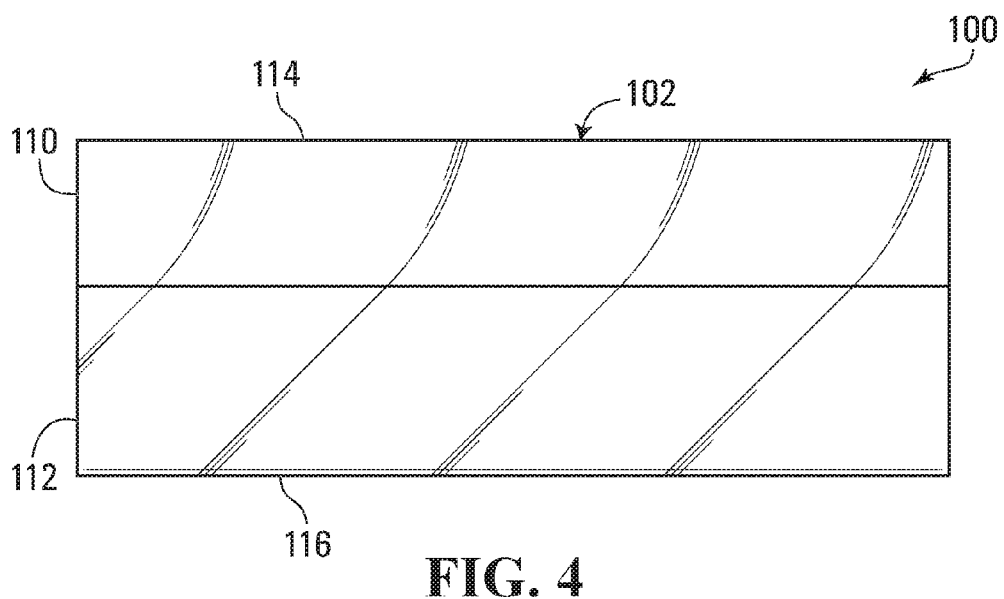
FIG. 4 is a top elevation view of the apparatus of FIG. 1.

Referring to FIGS. 2, 3 and 6, in this embodiment each redirector 102 is installed with its sharp upstream edge 114 in an opening of the air inlet 106, with the sharp upstream edge 114 pointing into the air inlet 106 in a direction roughly parallel but opposed to the incoming airflow 104 that is entering the cabin 108 through the air inlet 106. The sharp upstream edge 114 is positioned about half-way across the incoming airflow 104, so as to divide and stratify the incoming airflow 104 as discussed below in greater detail under the heading, "Operation". Alternatively, the redirector 102 need not be installed with its sharp upstream edge 114 disposed within the opening of the air inlet 106 itself, instead the redirector 102 may be installed with its sharp leading edge outside of but in sufficient proximity to the air inlet 106 so as to be able to divide and stratify the incoming airflow 104 in the manner discussed below. Conversely, in other embodiments the redirector may be installed with its sharp leading edge penetrating further into the air inlet 106, depending on the type and configuration of the aircraft in question.

In this embodiment, the redirecting portion 112 of the redirector 102 protrudes slightly into the space near the ceiling of the cabin 108 above the window seat. In this embodiment, the rounded shape of the rounded downstream edge 116 of the redirecting portion 112 reduces the likelihood of injury if the window seat passenger inadvertently bumps his or her head on the redirector 102.

Advantageously in this embodiment, as the installation of the redirectors requires only simple screws and hand tools, an entire commercial passenger aircraft can be retrofitted with redirectors 102 for all of its air inlets 106 in a single overnight installation, with an estimated 20 to 50 person-hours of labour, thereby advantageously avoiding the need to take the aircraft out of service and lose significant revenue over a period of months as would have been the case with prior attempts to reduce pathogen propagation.

Although ease of retrofitting is one of the advantages of the present embodiment, alternatively, an aircraft may be manufactured from the outset to include redirectors 102 for all of its air inlets 106.

It will be appreciated that the aircraft cabin 108 is merely one example of an enclosed space having upper air inlets and lower air outlets, in which the redirector 102 is configured to receive an airflow from one of the upper air inlets and downwardly redirect at least a portion of the airflow. Alternatively, the enclosed space may include a passenger compartment of a public transportation vehicle, such as a train or a bus, for example.

Operation

Referring to FIGS. 3, 5 and 6, in this embodiment each redirector 102 is configured to divide its incoming airflow 104 into at least a first airflow portion 118 flowing downwardly along one side of the redirector 102 and a second airflow portion 122 flowing along an opposite side of the redirector. In this embodiment, the one side of the redirector 102 along which the first airflow portion 118 flows is the generally concave lower surface 120 of the redirector, and the opposite side of the redirector 102 along which the second airflow portion 122 flows is the generally convex upper surface 124 of the redirector.

More particularly, in this embodiment the redirector 102 is configured to divide the incoming airflow 104 into the first airflow portion 118, the second airflow portion 122 and a third airflow portion 126, with the second airflow portion 122 flowing downwardly along the opposite side of the redirector 102 and the third airflow portion 126 flowing along a ceiling 128 of the cabin 108. To achieve this, the sharp upstream edge 114 of the dividing portion 110 first divides the airflow 104 into a lower airflow portion flowing beneath the lower surface 120 of the redirector 102 and an upper airflow portion flowing above the upper surface 124 of the redirector. The lower airflow portion is guided by the concave shape of the lower surface 120 and thus follows the shape of the redirector 102, being guided along the dividing portion 110 and then being guided in a generally downward direction by the redirecting portion 112.

The upper airflow portion that flows above the upper surface 124 of the redirector 102 is influenced by the Coanda effect, whereby a fluid jet tends to adhere to and stay in contact with a nearby surface, which in this case is the convex upper surface 124. Consequently, the upper airflow portion includes the second airflow portion 122, which tends to adhere to the generally convex upper surface 124 due to the Coanda effect, and thus the second airflow portion 122 is guided along the upper surface 124 and is redirected in a generally downward direction following the direction of the upper surface 124. However, as the Coanda effect describes a tendency rather than an absolute rule, not all of the upper airflow portion will adhere to the upper surface 124. Instead, some of the upper airflow portion will continue to travel past the redirector 102 and will generally follow the direction of the ceiling 128 of the cabin, again by virtue of the Coanda effect. Consequently, in this embodiment the upper airflow portion also includes the third airflow portion 126 which flows along the ceiling 128 of the cabin 108.

It will be appreciated that each redirector 102 does not merely function in isolation, but also co-operates with other elements, including an opposing redirector 102 on the opposite side of the same row of the aircraft (as well as center airflow inlets as discussed in the following paragraph below). Thus, as shown in FIG. 5, in this embodiment the apparatus 100 includes first and second redirectors 102, which in this embodiment are identical to but mounted in opposite orientations from each other, in proximity to first and second air inlets 106 on opposite sides of the cabin 108. In this embodiment, the first and second redirectors 102 are respectively configured to receive first and second airflows 104 from first and second respective air inlets 106 at opposite sides of the cabin 108. In the present embodiment, the first and second redirectors 102 are configured to divide each one of the first and second airflows 104 into the first, second and third airflow portions 118, 122 and 126, and to cause the third airflow portion 126 of each one of the first and second airflows 104 to collide with an opposing airflow that includes at least one of an airflow from a center air inlet of the cabin, and the third airflow portion 126 of the other one of the first and second airflows 104.

In this regard, in addition to the side air inlets 106, in this embodiment the aircraft cabin 108 further includes center air inlets 132, which in this embodiment direct their respective airflows on a downward angle relative to horizontal. Due to the Coanda effect, some of the incoming airflow from each center air inlet 132 will tend to adhere to the cabin ceiling 128 as it travels downward, and will thus redirect itself radially outward along the cabin ceiling 128 in the opposite direction to the third airflow portion 126. Thus, in this embodiment the airflows from the center air inlets 132 tend to collide with the third airflow portions 126 of the first and second airflows 104, conferring additional downward momentum to the resulting combined airflow.

Also in this embodiment, the third airflow portions 126 of the first and second airflows 104 flow in a generally horizontal inward direction. Although some of the third airflow portions may adhere to the ceiling 128 of the cabin 108 and thus rise upward in the center aisle region, some of the third airflow portions will tend to continue travelling horizontally across the cabin to collide with each other along the portion of the ceiling 128 above the passenger seats.

Accordingly, in this embodiment the redirector 102 redirects the first airflow portion 118 of the incoming airflow 104 in a generally downward direction in the vicinity of the window seat adjacent the air inlet 106 from which the airflow originates, and redirects the second airflow portion 122 of the incoming airflow 104 in a generally downward direction in the vicinity of the middle seat adjacent to the window seat. The third airflow portion 126 of the incoming airflow 104 is directed in a generally horizontal direction along the cabin ceiling 128, before colliding with the airflows from the center air inlets 132 and with some of the third airflow portion 126 that was redirected by another redirector on the opposite side of the aircraft at the same row position, resulting in a generally downward airflow in the vicinity of the aisle seat. More particularly, in this embodiment the first and second airflow portions 118 and 122 co-operate to effectively create a curtain of air between the window seat and middle seat, while the third airflow portion 126 and the airflow portion originating from the center air inlet 132 combine to create a curtain of air in between the middle seat and aisle seat. In this embodiment, each air curtain between adjacent passengers acts as a barrier that prevents pathogens from moving into others' breathing zones, and promotes the removal of contaminated air. The downward airflows co-operate to provide such stratified walls or air curtains between adjacent seats, and breathing zone air between the curtains also tends to be stratified, although the stratification of the breathing zone air is subject to the effects of the turbulent nature of the air adjacent to the main streams of downward airflow. Thus, in this embodiment each of the passengers in the window, middle and aisle seats of the row will effectively be provided with their own personal stratified downward airflow, from the vicinity of the ceiling 128 of the cabin 108 down to the air outlets 130 at the bottom of the cabin 108.

Advantageously, as discussed below, it has been found that the resulting stratified airflow patterns tend to significantly decrease inhalation of pathogens by passengers, and to increase the fresh air percentage of inhaled air.

Figure 7C:
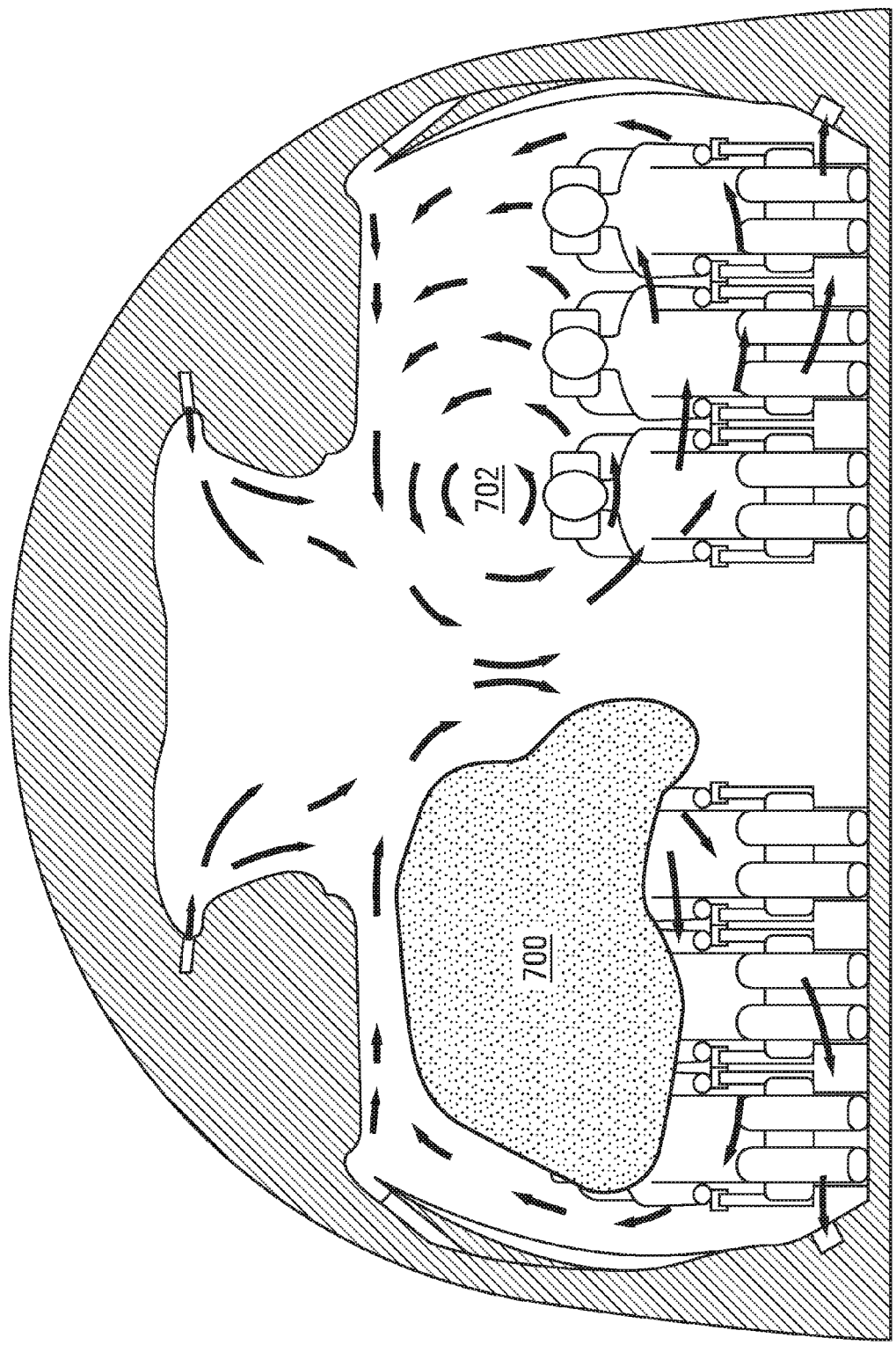

For example, referring to FIGS. 7A, 7B and 7C, a simulated passenger sneeze in a conventional aircraft not equipped with the present invention is shown generally at 700. In the conventional aircraft, some of the expelled pathogens of the sneeze 700 are propagated into the breathing areas of adjacent passengers in the same row, mainly by a general mixing airflow pattern 702, and also to a lesser extent by deflection off the convexly curved back of the seat in front of the passenger who sneezed. The general mixing airflow pattern 702 results from the configuration of the side and ceiling air inlets and of the near-floor baseboard air outlets of the conventional aircraft. In addition to lateral mixing, the general mixing airflow pattern 702 also promotes very active longitudinal mixing, so that the pathogens also spread to passengers in nearby rows.

Figure 8A:
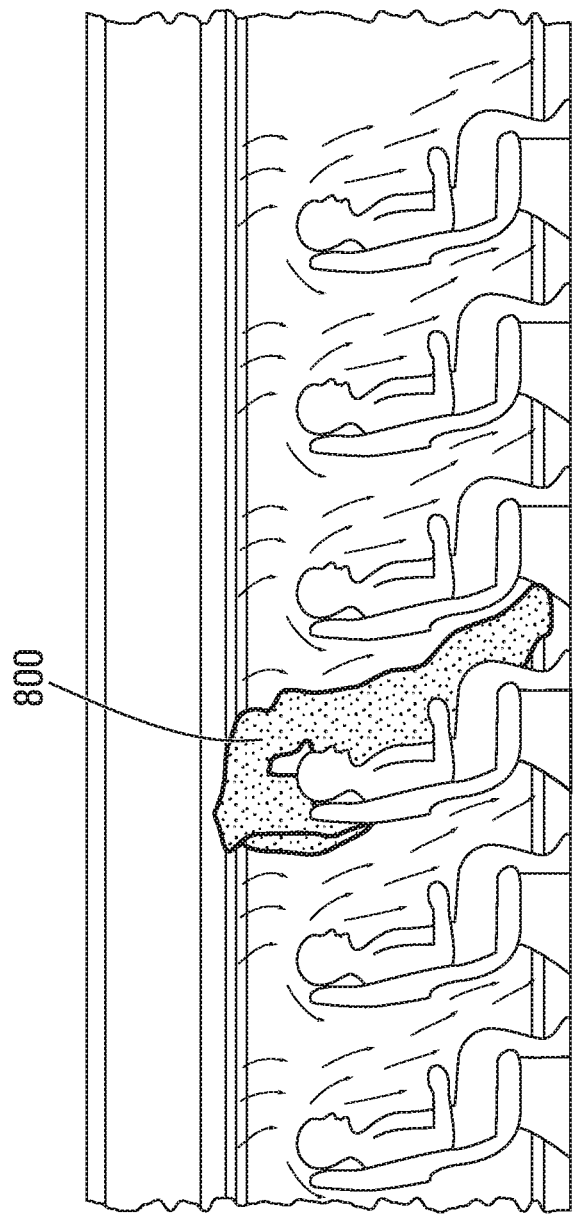
FIGS. 8A, 8B and 8C respectively show a side view, a top view and a front view of a simulated passenger sneeze in the modified aircraft cabin of FIGS. 5 and 6.
Figure 8B:
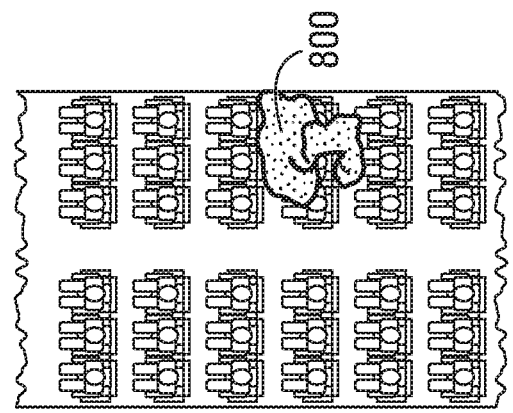
Figure 8C:
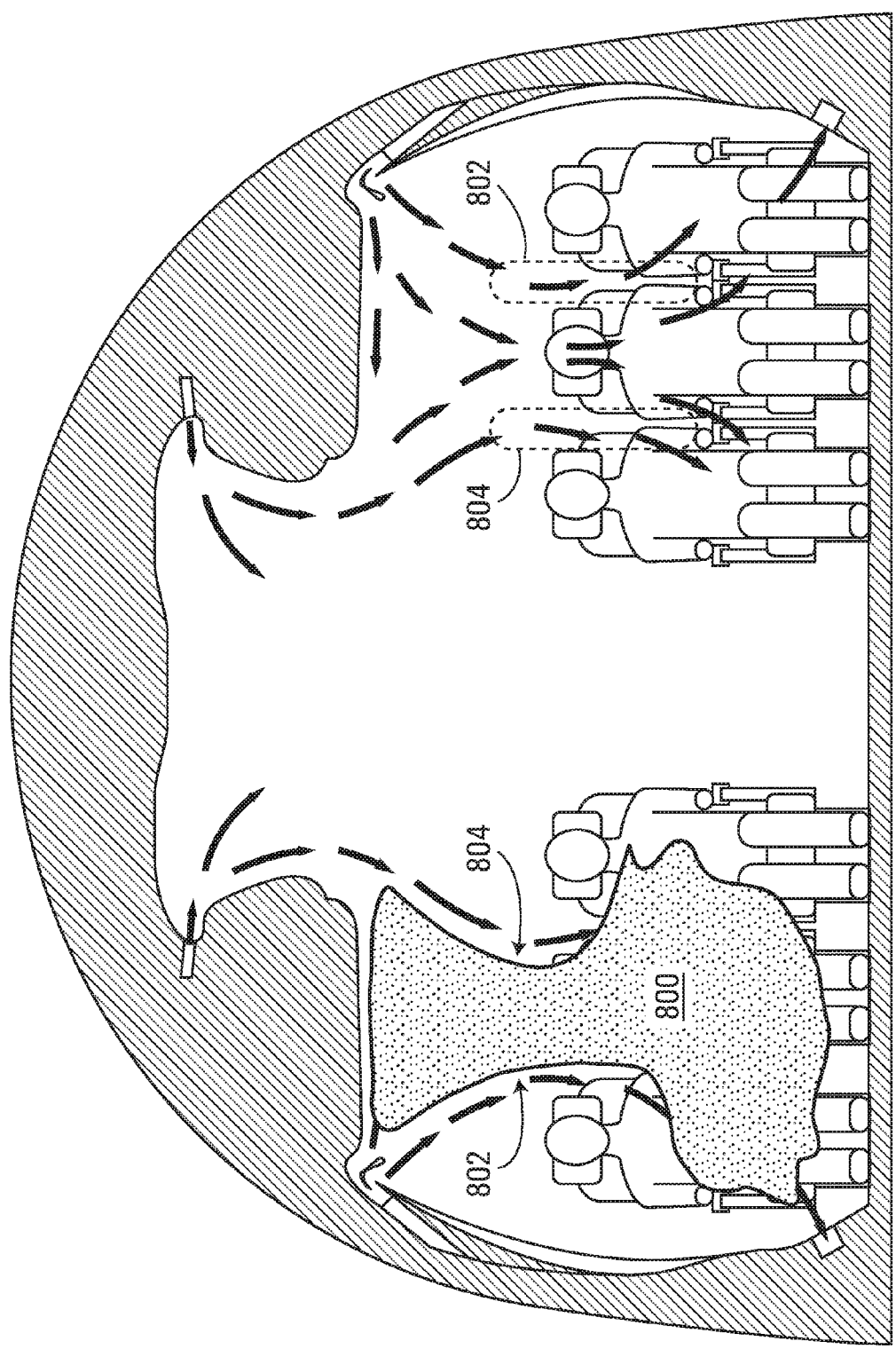

In contrast, referring to FIGS. 8A, 8B and 8C, a simulated passenger sneeze originating from the same seat in an aircraft equipped with redirectors 102 of the present embodiment is shown generally at 800. As mentioned above, in this embodiment the first and second airflow portions 118 and 122 co-operate to effectively create an air curtain 802 between the window seat and middle seat, while the third airflow portion 126 and the airflow portion originating from the center air inlet 132 combine to create an air curtain 804 in between the middle seat and aisle seat. In this embodiment, the air curtains 802 and 804 and their associated stratified downward airflows tend to convey the pathogens downward toward the air outlets 130 instead of allowing them to recirculate in the breathing areas of the adjacent passengers in the same row; although some pathogens may still spread to the adjacent passengers, this tends to occur predominantly in the vicinity of the adjacent passengers' legs or waists, and not within the passengers' breathing areas. In addition, the stratified downward flows significantly inhibit longitudinal mixing, thereby inhibiting the ability of the pathogens to spread to nearby rows before being drawn out through the air outlets 130. For example, it has been shown that in one embodiment, the redirector may reduce pathogen inhalation by up to 98%, and may increase the proportion of inhaled air that is fresh air by over 190%.

Electronic and Physical Simulations

The utility of the redirector 102 as an airflow redirecting apparatus is readily apparent from the drawings and the above description, from which it is clear that the airflow 104 will be divided and redirected as described above. Accordingly, the redirector 102 is useful for that purpose even apart from any potential effect in reducing pathogens.

Moreover, the further advantageous effects of the redirector 102 in reducing pathogen inhalation and in increasing fresh air inhalation have been demonstrated by a combination of computational and physical simulations. In this regard, detailed empirical studies of actual aircraft cabins are impractical, chiefly due to the spatial resolution limitations of empirical measurement equipment such as particle velocimetry systems, and partly due to the high cost of creating a 1:1 scale physical mockup.

Simulations Using Computational Fluid Dynamics (CFD)

Computational Fluid Dynamics simulations are preferred in both industry and academia for their usefulness and accuracy in predicting and illustrating cabin airflow scenarios. Yet, a literature review reveals that existing CFD simulations typically lack attention to actual aircraft cabin features. For example, the cabin shapes and contours are typically over-approximated, leading to unphysical results. Cabin airflow inlets and outlets tend to be imprecisely placed in previous simulations, which neglects important factors affecting cabin airflow. Human geometry is typically not modelled realistically, so that humans may be modelled by boxes for example, rather than statistically proportionate human models. Few CFD simulations have simultaneously considered multiple phenomena. Consequently, important effects like the interaction of turbulence and convection are often ignored. Moreover, despite the known fact that cabins propagate airborne disease, the available literature regarding the use of CFD in actually engineering solutions to curb disease spread is limited.

Accordingly, in view of the above deficiencies and challenges with conventional CFD analysis, the present inventor has created detailed and accurate 3D CAD Models of Narrow Body Aircraft using publically available 2D Technical Diagrams & Statistical Data. High-resolution CFD simulations have been conducted using empirically derived cabin environmental data & physical models of interactions among multiple phenomena to gain new insights about global cabin airflow. These steps have allowed the present inventor to design economic and readily implementable cabin modifications such as the redirector 102, to globally improve air quality and isolate pathogens emitted from passengers during travel, curbing potential disease spread. Physical testing using a scale model has also been conducted to confirm the CFD results, as discussed further below.

Generally, the CFD simulations conducted by the present inventor have augmented the industry's understanding of pathogen propagation in airplane cabins. In particular, the present embodiment employs a high-fidelity simulation grid which resolves previously unseen flow features (3-5×). The present embodiment accounts for multiple phenomena including convection and turbulent flow. This embodiment also utilizes true-to-life cabin geometry, modelled using technical documents. Cabin air inlets & outlets are precisely placed, and statistically representative seated human mannequins have been created. Cabin airflows can be quantitatively and qualitatively analyzed from multiple perspectives.

In the CFD simulations conducted by the present inventor, popular narrow-body aircraft were modelled, selected for their widespread use in short and long haul flights. Available airport planning and reference manuals were used to generate precise simulations. More particularly, the Airbus A320 family and the Boeing B737 family of aircraft were modelled, although the results of the simulation may be extrapolated to other similar aircraft, and the techniques described herein may be similarly used to model other types of aircraft directly. The specific CFD results discussed in greater detail below were obtained for an Airbus A320 aircraft.

Although seating configurations may vary, a widespread seating configuration was employed, namely a 3-3 configuration having 3 seats on each side of the center aisle, in which each set is approximately 41 cm wide with a pitch of 82 cm, and the center aisle is 51 cm wide, based on FAA regulatory specifications.

To model humans, statistically determined proportions were employed using the U.S. Department of Transport's Human Factors Design Standards Manual.

Industry standard ANSYS CFX code was selected as the Computational Fluid Dynamics numerical solver software for the simulation. Particularly, the simulation method employed a coupled, fully implicit, pressure-based solver using an unstructured finite element based Finite Volume Method (FVM), using a vertex-centered approach involving polyhedral control volumes from tetrahedral cells. In this regard, a vertex-centered approach is typically better suited to achieving convergence of coarser meshes than a cell-centered method. The solutions are solved and stored at the nodes of the mesh, allowing for denser meshes.

To overcome computational bottlenecks that afflicted some previous research in this area, a specialized workstation was developed, using an 8-core 4 GHz CPU with 32 GB of RAM to enable resolution of fine CFD grids with more than 20 million cells. Various parallel processing techniques, including GPGPU (general purpose graphics processing unit) acceleration of computations by using the GPU for non-specialized calculations that would typically be conducted by the CPU, and the local application of a suitable Message Passing Interface (MPI), enabled the CFD solution to be solved simultaneously on multiple cores.

CFD pre-processing was conducted for flow domain definition and discretization. CFD operates only on fluid regions, and thus the control volume must first be explicitly defined. The fluid domain can be extracted using CAD Boolean operations. The domain must be discretized to allow for a numerical solution. In this embodiment, a primarily tetrahedral, patch-independent mesh scheme was employed, applying proximity and curvature-based grid refinement to preserve cabin integrity. Prism layers were applied at boundaries to better resolve flow features.

Typical mesh quality standards for CFD were exceeded. In this regard, high Orthogonal Quality, greater than 0.01, and low Skewness, less than 0.95, were desired. In terms of node count and element count, the present embodiment sought to pioneer the finest resolution ever achieved for aircraft cabin airflow. In this regard, most previous CFD work for aircraft cabins was based on about 3 million cells, and it is believed that no previously published CFD aircraft cabin study has employed more than 10 million cells. In contrast, the simulations of the present embodiment employed aircraft cabin geometry that varied in cell count from 15-20 million elements.

In this embodiment, partitioning was applied to enable parallel processing for full CPU utilization in the solution calculation. More particularly, in this embodiment the industry standard MeTiS Multilevel Graph Partitioning Method was selected, employing 8 partitions with equal weighting (0.125).

The CFD solver predicts cabin airflow by numerically converging solutions to the partial differential Navier-Stokes equations, which cannot be solved analytically. These equations are augmented with equations of state for enthalpy and density to form a closed system. For precision, the simulations implemented second-order discretization schemes of all transport equations.

With respect to the governing equations and Navier-Stokes CFD Setup, the ANSYS CFX CFD solver applies the instantaneous Navier-Stokes equations in conservation form. In this regard, let $\phi$ represent a generic physical quantity (such as concentration, for example, although numerous other physical quantities such as temperature or velocity obey differential equations of the same form). The principle of conservation of that quantity $\phi$ can be expressed as a general differential equation, whereby accumulative and convective terms are balanced by diffusive and source terms:

$$\underbrace{\frac{\partial \rho \phi}{\partial t}}_{Accumulation} + \underbrace{\nabla \cdot (\rho u \phi)}_{Convection} = \underbrace{\nabla \cdot (\Gamma \nabla \phi)}_{Diffusion} + \underbrace{S_\phi}_{Source} \quad (1)$$

where $\rho$ is the density; t is time; $\phi$ is a generic physical quantity (e.g., concentration); $\nabla$ is the del (or nabla) operator, $$\nabla = \left[\frac{\partial}{\partial x}, \frac{\partial}{\partial y}, \frac{\partial}{\partial z}\right];$$

u is the flow velocity; $\Gamma$ is the diffusion coefficient; and $S_\phi$ is a general source term.

In equation (1), the accumulation term represents the temporal rate of change of the quantity $\phi$ in an infinitesimal volume. The convection term represents the transport of the quantity $\phi$ due to the velocity field u. The diffusion term represents the transport of the quantity $\phi$ due to gradients of that quantity. The source term $S\phi$ collectively represents any sources or sinks that create or destroy the quantity $\phi$, and may also incorporate any further relevant terms that do not fit within the accumulation, convection or diffusion terms of equation (1).

From conservation of mass, it follows that:

$$\frac{\partial \rho}{\partial t} + \nabla \cdot (\rho U) = 0. \quad (2)$$

From conservation of momentum, it follows that:

$$\frac{\partial (\rho U)}{\partial t} + \nabla \cdot (\rho U \otimes U) = -\nabla p + \nabla \cdot \tau + S_M \quad (3)$$

wherein the stress tensor is related to strain rate by:

$$\tau = \mu \left( \nabla U + (\nabla U)^T - \frac{2}{3} \delta \nabla \cdot U \right). \quad (4)$$

From conservation of energy, it follows that:

$$\frac{\partial (\rho h_{tot})}{\partial t} - \frac{\partial p}{\partial t} + \nabla \cdot (\rho U h_{tot}) = \nabla \cdot (\lambda \nabla T) + \nabla \cdot (U \cdot \tau) + U \cdot S_M + S_E. \quad (5)$$

Subtracting the mechanical energy Emechanical, the thermal energy Ethermal is thus:

$$\frac{\partial (\rho h)}{\partial t} + \nabla \cdot (\rho U h) = \nabla \cdot (\lambda \nabla T) + \tau : \nabla U + S_E. \quad (6)$$

In this embodiment, the ANSYS CFX CFD solver converges numerical solutions to the above equations, which are augmented with equations of state for enthalpy and density to form a closed system. More particularly, in this embodiment the CFD solver solves Reynolds Time-Averaged Navier Stokes (RANS) equations with turbulence modelling. More particularly still, in this embodiment the turbulence modelling employs a Re-Normalization Group (RNG) k-epsilon model, in which k represents turbulence kinetic energy and epsilon ($\epsilon$) represents turbulence eddy dissipation.

Correct modeling of air and pathogen particles is important to ensure accurate simulation of contaminant transport in the cabin. In this embodiment, air was defined as a continuous fluid with specifications from the CFX database, whereas pathogens were defined as particles based upon amalgamated data.[11] To track interactions between the materials, the Discrete Phase Model (DPM), shown below in its general form, was used, whereby the trajectories of the pathogen particles were computed in a Lagrangian frame, interacting with the air in the Eulerian Frame:

$$\frac{du_i^p}{dt} = F_D(u_i - u_i^p) + g_i(\rho_p - \rho)/\rho_p + F_i/\rho_p. \quad (7)$$

Particle movement can be accounted for by the effects of drag and gravity. Additional terms for pressure gradients, Brownian motion, and the Saffman lift force were selected for inclusion to mimic actual physical conditions. To eliminate unnecessary computational cost, one-way coupling of the air and particles was employed, whereby the particle sizes are assumed to be too insignificant to influence the movement of air.

In order to create realistic CFD simulation scenarios, boundary conditions were specified for all the fluid inlets and outlets in the computational domain. Referencing existing measurements,[12] the inlet and outlet conditions were modelled as described below. As is standard practice in these scenarios [CT], a turbulence intensity of 10% with the "high" eddy viscosity ratio setting was used for all inlets. With respect to boundary conditions, velocity inlet & pressure outlet pairing is viewed as the most stable numerical configuration method.

For cabin inlet velocities, in this embodiment an inlet flow velocity of 3 m/s is assumed for the center air inlets 132 shown in FIG. 6, while an inlet flow velocity of 2.7 m/s is assumed for the side air inlets 106. For both inlet types, it is assumed that the incoming airflow is normal to the boundary.

For cabin outlet pressures, an outlet relative pressure of −43 Pa is assumed, with a profile blend of 0.05, averaged over the entire outlet.

In addition to the cabin air inlets, a sneezing passenger is considered to effectively act as a "passenger inlet" for pathogens. In this embodiment, such a "passenger inlet" is defined as a single mass flow for pathogens. The bulk mass flow rate was set to 0.0000318 [kg s^−1] normal to the boundary, using empirical data for sneezes obtained from previous literature. The initial pathogen particle temperature was set at 37 [C], typical for human bodies. A sneeze was treated as a momentary activation only at timestep t=0.25 seconds.

Thermal effects were carefully modelled in order to account for the influence of phenomena such as convection on the patterns of cabin airflow and disease spread.

Boundary conditions for thermal factors also greatly influence airflow within cabins. In this embodiment, key cabin heat surfaces were considered, as shown in Table 1 below; all other surfaces were configured to be adiabatic.

TABLE 1

| Key Cabin Heat Surfaces | |
|---|---|
| Heat Source | Temp [C.] |
| Cabin Lights | 24.7 |
| Ceiling Panels | 22 |
| Floor Panels | 23 |
| Side Panels | 21 |
| Window | 16 |
| Supply Air | 19.5 |
| Passenger Core | 30.3 |

In this embodiment, it was sought to capture important phenomena often neglected in many previous cabin airflow studies. For example, in this embodiment advection terms were enabled, thereby enabling transfer of thermal energy through fluid (air).

Buoyancy was modelled with a Boussinesq assumption, whereby the small range of temperature variations in the cabin render density differences of air sufficiently small to be neglected, except where gravity terms are considered. In this regard, a full buoyancy model was unnecessary due to the typically small magnitude of temperature fluctuations in aircraft cabins. In this embodiment, a buoyancy reference density of 0.877566 kg m/s$^3$ and a buoyancy reference temperature of 21° C. were employed. In addition, these thermal phenomena interact with gravity, and thus in this embodiment a gravitational acceleration of 9.81 m/s$^3$ was involved in the modelling of convection.

With respect to flow domain initialization, since CFD solvers calculate solutions through repeated iteration, it is important that realistic initial values be provided to promote convergence. In this embodiment, the cabin domain was specified as initially consisting of 100% air at a typical at-altitude reference pressure of 74100 Pa,[13] with a nominal cabin temperature of 21° C.[11]

Mixing airflow patterns in aircraft cabins are inherently transient. However, to promote numerical stability in the final result, all test scenarios were first approached as air-only steady state flow problems, solved using time-averaged variants of the aforementioned governing equations. These initial solutions are considered to have converged when the root mean square (RMS) residuals of all equations flatlined below 10-3. The steady-state solutions were then assessed for general behavioral sensibility, before they were fed as initial conditions for transient calculations involving sneezing passengers. Transient simulations utilize timestepping techniques to discretize simulated time; at each timestep of the outer solver loop, additional iterations in coefficient loops are required to resolve flow at each point in simulated time. Through trials with the Courant number, an adaptive timestep size ($\Delta t$) was used at each iteration to balance solver numerical stability with total CFD simulation length. The transient solution process was monitored for consistent saw-tooth convergence patterns, with a convergence criterion of 10-4 for RMS residuals. Global imbalance metrics were also required to meet a conservation criterion of <0.01.

In this embodiment, the CFD solver results indicate that the redirector 102 of the present embodiment reduces pathogen transmission.

For example, referring to FIGS. 7A to 8C, a simulated passenger sneeze in a conventional aircraft cabin is shown generally at 700 in FIGS. 7A to 7C, while a simulated passenger sneeze in an aircraft cabin that has been modified to include a plurality of redirectors 102 according to the present embodiment is shown generally at 800 in FIGS. 8A to 8C. In both cases, it is assumed that the passenger who sneezed occupied a middle seat position, which in these examples was seat 4E (see also FIG. 10).

Comparing FIGS. 7A to 8A, 7B to 8B and 7C to 8C, it can readily be seen that the expelled pathogens travel further both laterally and longitudinally in the conventional cabin of FIGS. 7A-7C than in the modified cabin of FIGS. 8A-8C. With respect to lateral propagation to other passengers in the same row, in the conventional cabin of FIGS. 7A-7C, the expelled pathogens tend to be redirected into the breathing spaces of the adjacent passengers in the row. This redirection is caused primarily by strong turbulent swirling patterns in the conventional cabin, including the general mixing airflow pattern 702 shown in FIG. 7C. To a lesser extent, deflection off the curved seatback in front of the sneezing passenger also contributes to redirection of the pathogens. In contrast, in FIGS. 8A, 8B and 8C it can be seen that the expelled pathogens tend to be pushed down by the modified and stratified airflow, including air curtains 802 and 804 discussed earlier herein, to exit the cabin via the outlets. Although FIG. 8B does appear to show some pathogen transmission into the seating areas of the adjacent passengers, FIG. 8C illustrates that this tends to occur predominantly in the vicinity of the adjacent passengers' legs or waists rather than their breathing areas.

With respect to longitudinal propagation and the potential infection of passengers in the rows ahead of or behind the sneezing passenger, a comparison of FIGS. 7A and 8A illustrates that in the modified cabin of FIGS. 8A-8C, the improved and stratified airflow pattern tends to more effectively confine the expelled pathogens to the row of the sneezing passenger than in the conventional cabin of FIGS. 7A-7C.

Figure 9:
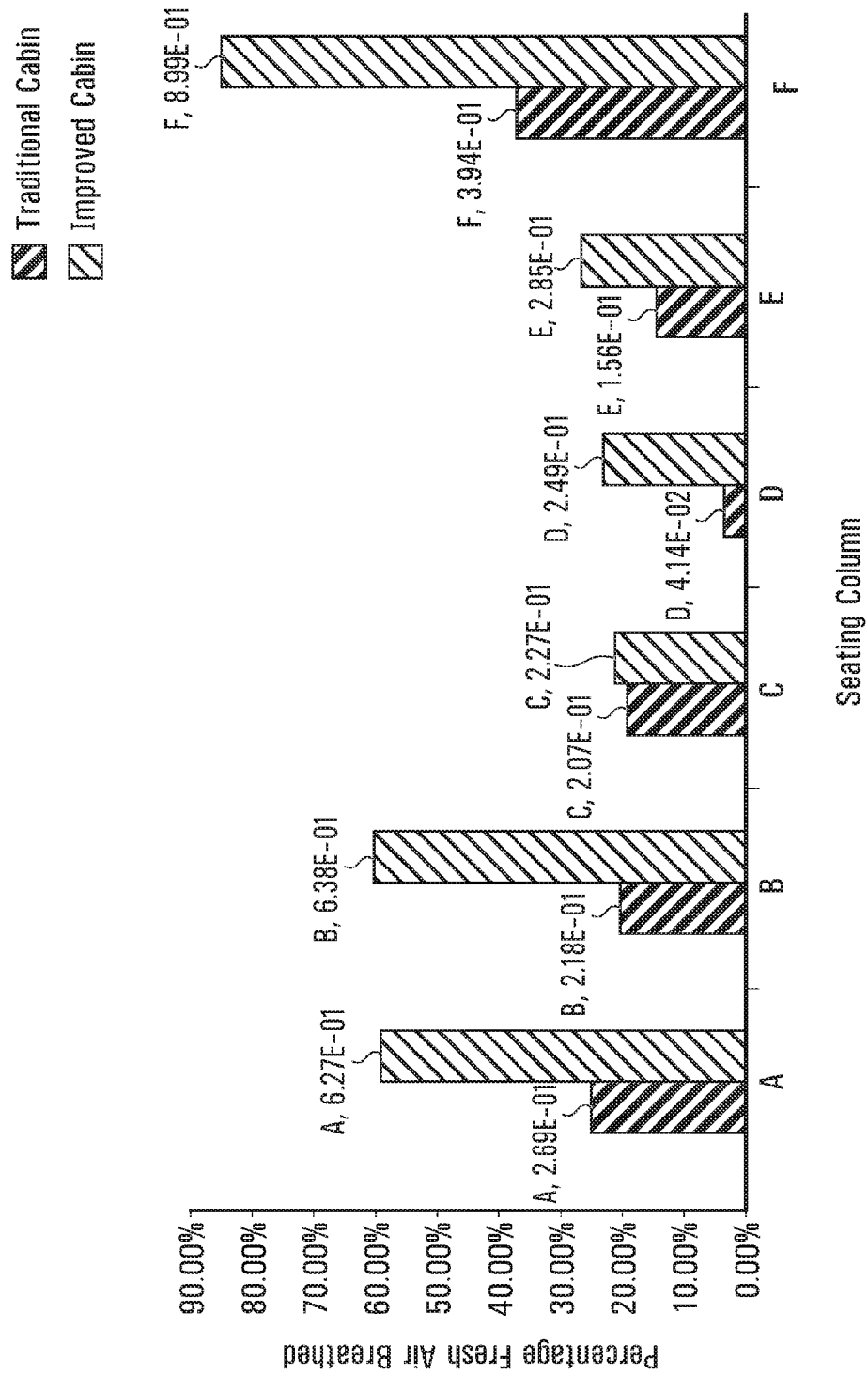
FIG. 9 is a graphical comparison of the inhaled fresh air percentage for passengers in the conventional cabin versus the modified cabin of FIGS. 5 and 6.
Figure 10:
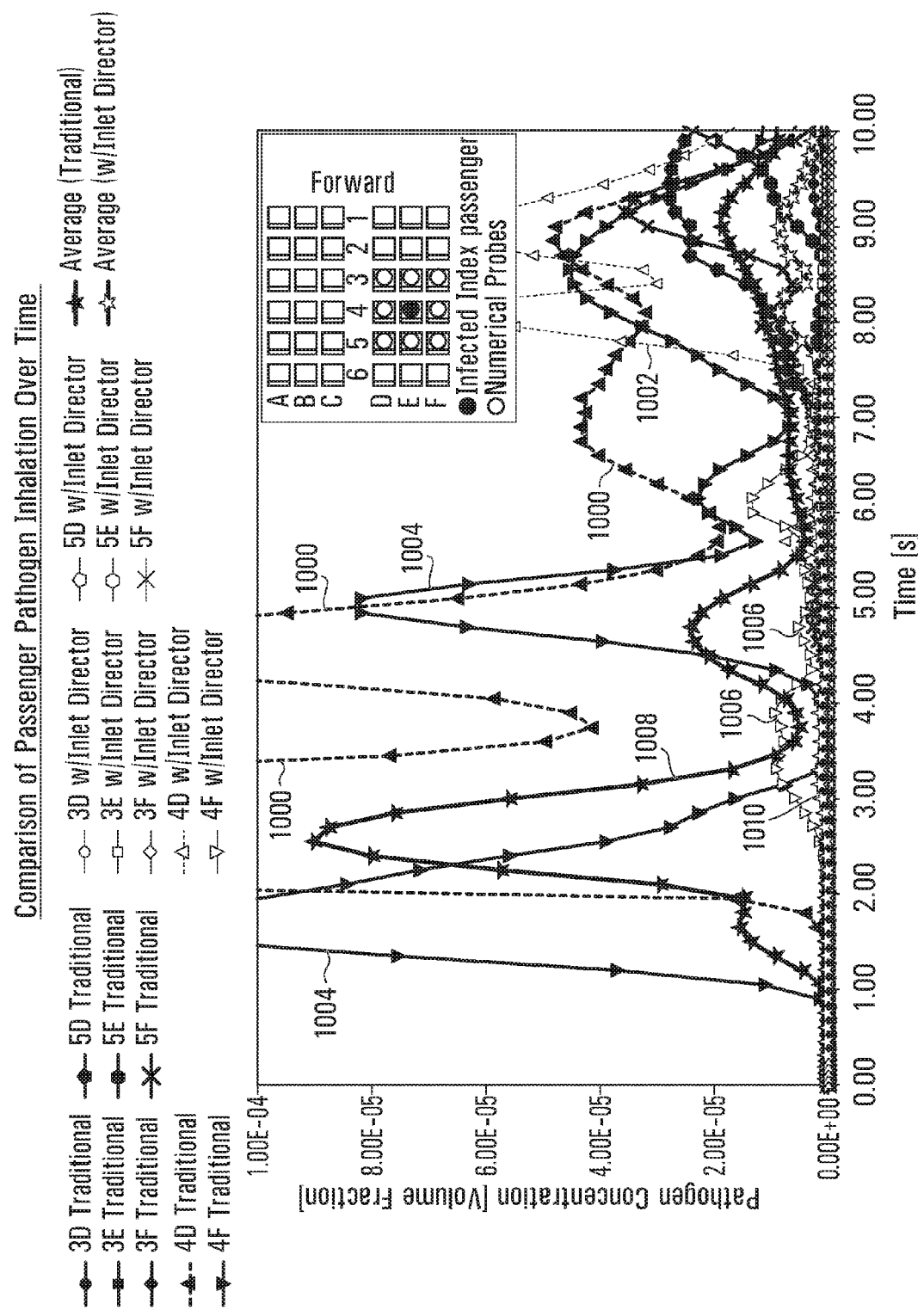
FIG. 10 is a graphical comparison of airborne pathogen concentrations in the conventional cabin versus the modified cabin of FIGS. 5 and 6.

FIG. 9 shows the percentage of inhaled air that is fresh air (as opposed to recirculated air), for each of the six seating columns A through F (see also FIG. 10). More particularly, FIG. 9 shows a time-snapshot taken from a transient simulation rather than time-averaged results. For each seating column, the left fresh air column represents the inhaled fresh air percentage for a conventional aircraft cabin, while the right fresh air column represents the inhaled fresh air percentage for a modified aircraft cabin equipped with a plurality of redirectors 102. It can be seen that for the modified cabin, the fresh air percentage increases for all six of the seating columns, and more than doubles for seating columns A, B, D and F. Consequently, it is expected that passengers will breathe significantly more fresh air and less recirculated air in a cabin equipped with redirectors 102 than in a cabin that is not so equipped.

Referring to FIG. 10, pathogen concentrations as a volumetric fraction are shown for the same two situations as FIGS. 7A-8C, in which a passenger in seat 4E sneezes in a traditional or conventional cabin not equipped with redirectors 102, and in which a passenger in the same seat sneezes in a modified cabin equipped with redirectors 102. A conventional curve 1000 shows the resulting pathogen concentration at the adjacent passenger aisle seat 4D of the conventional aircraft, while an improved curve 1002 shows the resulting pathogen concentration at the same seat 4D of the modified aircraft equipped with redirectors 102. Similarly, a conventional curve 1004 shows the resulting pathogen concentration at the adjacent passenger window seat 4F of the conventional aircraft, while an improved curve 1006 shows the resulting pathogen concentration at the same seat 4F of the modified aircraft equipped with redirectors 102. Similar contrasting curves for other seating positions are also shown in FIG. 10. A conventional average curve 1008 shows the average pathogen concentration for all of the considered seating positions for the conventional aircraft, while a modified average curve 1010 shows the average pathogen concentration for a modified aircraft equipped with redirectors 102.

Figure 11:
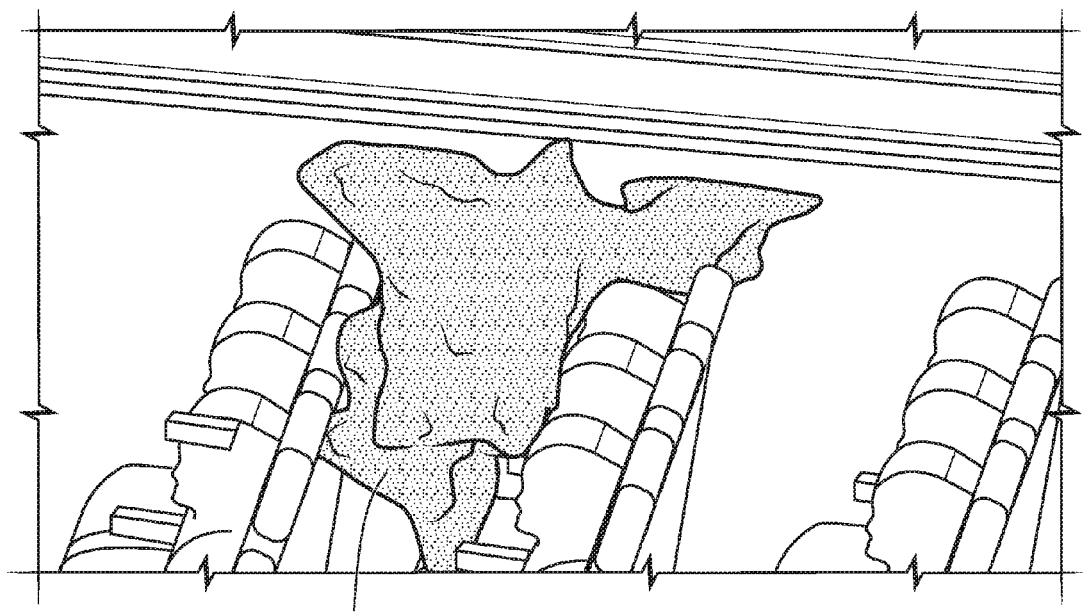
FIG. 11 is a pictorial illustration of a passenger sneeze from a window seat position in the modified cabin of FIGS. 5 and 6.
Figure 12:
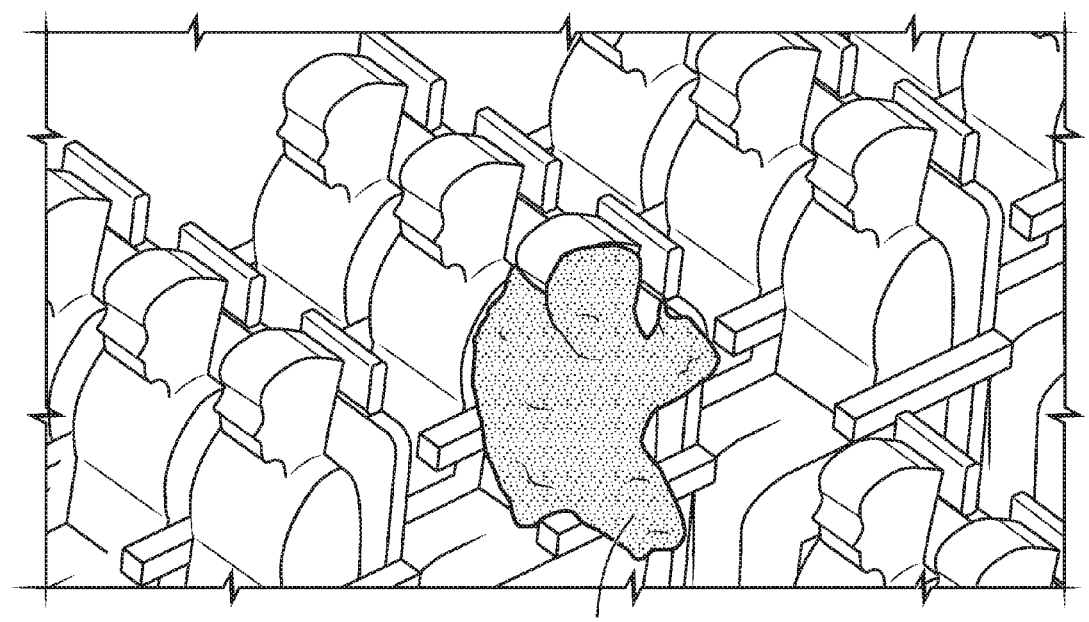
FIG. 12 is a pictorial illustration of a passenger sneeze from an aisle seat position in the modified cabin of FIGS. 5 and 6.

Although FIGS. 7A-8C and 10 simulated a sneeze originating from a middle passenger seat position (seat 4E), further simulations have confirmed similar effects from sneezes in other seating positions. For example, in FIG. 11, a simulated sneeze from a window seat position (seating column F) is shown generally at 1100, while in FIG. 12, a simulated sneeze from an aisle seat position (seating column D) is shown generally at 1200. In both cases, the modified and stratified airflow patterns created by the redirectors 102 tended to achieve similar advantageous effects to those illustrated in FIGS. 8A and 8B in comparison to the conventional aircraft of FIGS. 7A and 7B.

Physical Simulation

To verify the CFD results, 3:40 scale models of a conventional narrow-bodied aircraft cabin section and of a modified aircraft cabin section equipped with redirectors 102 were constructed from 3D printed translucent resin. Both models were of the same type of aircraft for which the CFD results described above were obtained.

Present inside the scale cabin were 3D printed mannequins of statistically proportionate human models. Channels were constructed through the passenger mannequins to enable controlled release of a simulated pathogen from their faces. The pressure-tight cabin environment was simulated with blowers and flow control valves calibrated such that the main cabin inlets and outlets delivered to-scale airflow. Comprehensive testing of global airflow and pathogen transmission respectively using water-based fog and dry ice as visualization agents further confirmed the advantageous features of the present embodiment as previously validated by the CFD simulations. For the scale model of the conventional cabin, very large swirls of airflow resulted in active mixing of cabin air, promoting the propagation of pathogens. In contrast, for the scale model of the modified cabin equipped with redirectors 102, noticeably greater fresh airflow and noticeably lower pathogen circulation occurred than in the conventional cabin scale model.

Alternatives

Although a specific shape of the redirector 102 has been shown in FIGS. 1-6, alternatively other forms of redirector may be substituted. The shape shown in FIGS. 1-6 is generally preferred for aircraft with non-slot-type air inlets. However, for aircraft having slot-type air inlets, other shapes of the redirector 102 may be more advantageous.

Figure 13:
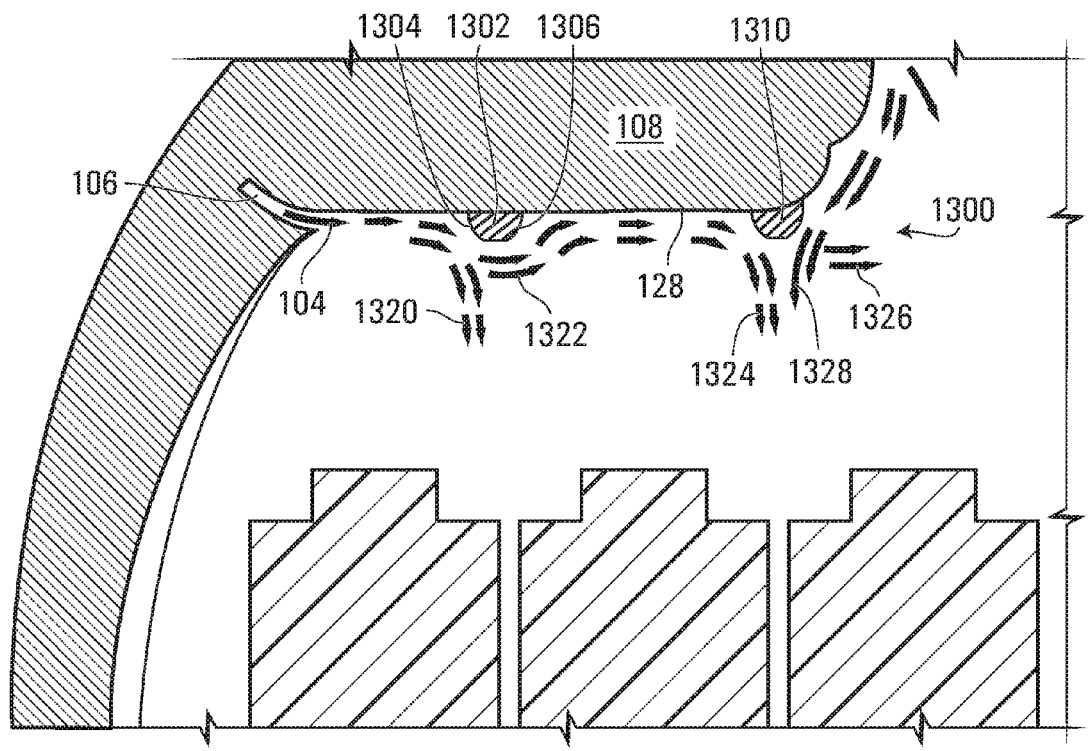
FIG. 13 is a partial rear cross-section of an aircraft cabin that has been modified by installing a redirector according to a second embodiment of the invention, proximate to a port-side air inlet of the cabin.
Figure 14:
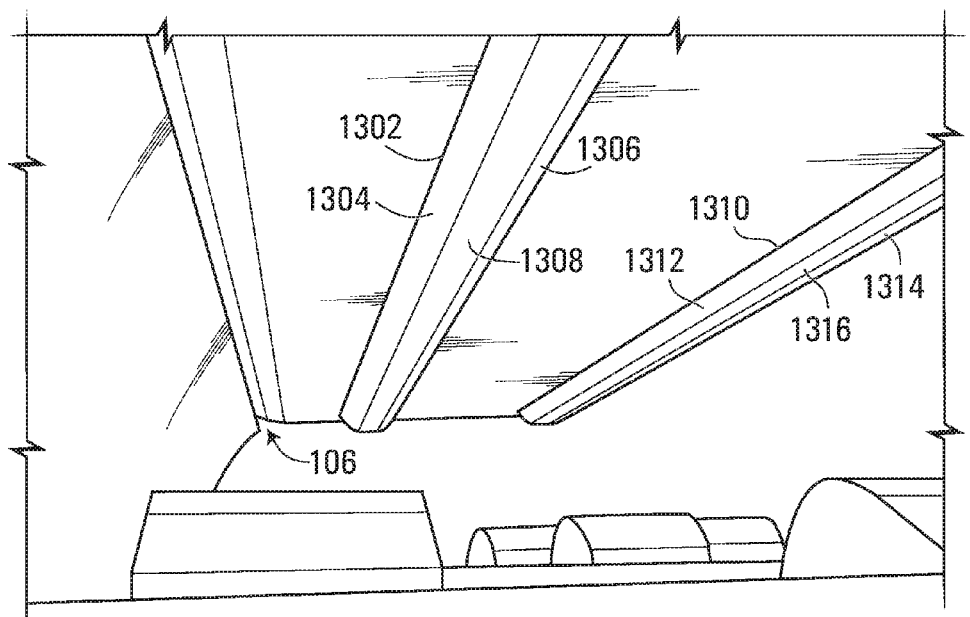
FIG. 14 is a rear perspective view of the redirector of FIG. 13.

For example, referring to FIGS. 13 and 14, an apparatus according to a second embodiment of the invention is shown generally at 1300. In this embodiment, the apparatus 1300 includes a first redirector 1302, which in turn comprises an elongated protrusion configured to be positioned on the ceiling 128 of the aircraft cabin 108. In this embodiment, the elongated first redirector 1302 extends longitudinally along the ceiling 128 of the cabin 108.

In this embodiment, the first redirector 1302 has rounded opposing outside and inside sidewalls 1304 and 1306, which extend vertically downward from the ceiling 128 of the cabin 108 while curving inward toward each other until intersecting a horizontal planar bottom surface 1308. Also in this embodiment, in addition to the curved outside and inside sidewalls 1304 and 1306, the forward and aft ends of the first redirector 1302 are also smoothly rounded with no sharp edges. Advantageously, therefore, if a passenger accidentally contacts their head against the first redirector 1302, it will contact against a smooth rounded surface rather than a sharp edged surface, thereby reducing the risk of injury.

In this embodiment, the apparatus 1300 further includes a second redirector 1310. In this embodiment, the second redirector 1310 is identical to the first redirector 1302, and thus includes curved opposing outside and inside sidewalls 1312 and 1314 and a planar bottom surface 1316. In this embodiment, the second redirector 1310 is mounted along the ceiling 128 of the cabin 108 parallel to but spaced apart from the first redirector 1302. More particularly, in this embodiment the first redirector 1302 is mounted at a location on the ceiling 128 between the window seat and the middle seat, while the second redirector 1310 is mounted at a location on the ceiling 128 between the middle seat and the aisle seat.

Although the first and second redirectors 1302 and 1310 are each shown as a unitary structure, alternatively the redirectors 1302 and 1310 may be modularly segmented, for ease of installation and to accommodate other items (e.g. speakers, no smoking signs, passenger service units, etc.) that may be present on the cabin ceiling.

In this embodiment, the first and second redirectors 1302 and 1310 are composed of polycarbonate. However, due to the placement of the first and second redirectors 1302 and 1310 along the ceiling 128 of the cabin 108, the first and second redirectors 1302 and 1310 are not as prone to blocking cabin light as the redirectors 102. Accordingly, in this embodiment the first and second redirectors 1302 and 1310 are composed of opaque white polycarbonate with an optional secondary accent color which makes the redirectors easily visible to passengers and thus reduces the risk of passengers bumping their heads on the redirectors, while simultaneously blending with the aesthetics of the cabin. Alternatively, if desired, the first and second redirectors 1302 and 1310 may be composed of translucent white polycarbonate, or optically transparent polycarbonate. More generally, any other suitable material may be substituted, provided it has sufficient flame retardant properties to be permitted as an aircraft cabin component. If desired, the first and second redirectors 1302 and 1310 may be hollow, to reduce weight.

In this embodiment, a plurality of the first redirectors 1302 and a plurality of the second redirectors 1310 extend longitudinally over a distance equal to the longitudinal length of the entire aircraft cabin, modularly implemented such that each unit, i.e. each pair of redirectors, is responsible for a respective air inlet section of the aircraft containing the air inlet 106 (typically two seating rows long). Similarly, in this embodiment each one of the plurality of air inlet sections of the aircraft, containing each respective one of the air inlets 106 of the aircraft, is equipped with a similar pair of first and second redirectors. Each such pair of first and second redirectors is generally identical to the pair of first and second redirectors 1302 and 1310, except insofar as the length of a given air inlet section and thus the length of the corresponding pair of first and second redirectors may vary. For example, the air inlets for the emergency exit rows may have a different air inlet length than other air inlet sections of the aircraft.

In this embodiment, the first redirector 1302 is configured to divide the incoming airflow 104 from the air inlet 106 into at least a first airflow portion 1320 flowing downwardly along one side of the redirector 1302 and a second airflow portion 1322 flowing along an opposite side of the redirector. More particularly, in this embodiment the incoming airflow 104 tends to initially follow the contour of the cabin ceiling 128 by virtue of the Coanda effect. As the airflow 104 travels inward along the ceiling 128, it first strikes the outside sidewall 1304 of the redirector 1302. As the airflow 104 strikes the sidewall 1304 of the redirector 1302, the sidewall 1304 downwardly redirects the first airflow portion 1320 of the incoming airflow 104, as shown in FIG. 13. However, by virtue of the Coanda effect, some of the incoming airflow 104 is not redirected downwardly, but rather, the second airflow portion 1322 of the incoming airflow 104 tends to follow the contours of the redirector 1302, travelling inward along the bottom surface 1308 and then back upward along the inside sidewall 1306 and inwardly along the ceiling 128 of the cabin 108.

Similarly, in this embodiment the second redirector 1310 effectively further divides the second airflow portion 1322 into a third airflow portion 1324 and a fourth airflow portion 1326 shown in FIG. 13. As the second airflow portion 1322 travels inward along the ceiling 128, it strikes the outside sidewall 1312 of the second redirector 1310, which downwardly redirects some of the incoming second airflow portion 1322, as the third airflow portion 1324. The remaining portion of the second airflow portion 1322 becomes the fourth airflow portion 1326, which tends to follow the contours of the second redirector 1310, continuing to travel inward within the cabin 108. In this embodiment, an additional airflow portion 1328 from the aircraft cabin's central ceiling inlets tends to follow the contours of the underneath of the overhead luggage compartments and may thus collide with the fourth airflow portion 1326, thereby redirecting some of the fourth airflow portion 1326 downward as well.

Advantageously, therefore, this second embodiment tends to produce a stratified downward airflow pattern somewhat similar to that produced by the first embodiment, with similar effects.

Although the first and second redirectors 1302 and 1310 are generally preferable for aircraft having slot-type air inlets such as those depicted in FIGS. 13 and 14, they can also be used with non-slot-type air inlets as shown in FIGS. 5 and 6. Conversely, although the redirector 102 of FIGS. 1-6 is generally preferable for aircraft having non-slot-type inlets, it can also be employed in aircraft having slot-type air inlets.

Although not present in the embodiment shown in FIGS. 13-14, if desired, either or both of the first and second redirectors 1302 and 1310 may include a plurality of long or short slots or other apertures (not shown) defined therethrough to further improve the airflow pattern for a particular aircraft. For example, in one embodiment only the first redirector 1302 has a plurality of slots defined therethrough, such that an additional airflow portion (not shown) travels through the slots of the first redirector 1302 and flows along with the second airflow portion 1322 to ultimately strike the inlet-facing sidewall 1312 of the second redirector 1310, and to thereby increase the flow of fresh air available at the second redirector 1310 for forming the downward third airflow portion 1324.

As a further example, referring back to FIG. 6, an alternatively shaped redirector may include a planar redirector with a plurality of openings, such as slots or apertures, defined therethrough. The planar redirector may be installed at an angle relative to the incoming airflow 104 somewhat similar to the angle of the redirecting portion 112 of the redirector 102, such that the portions of the incoming airflow that strike the solid portions of the planar redirector are directed downwardly, similar to the first and second airflow portions 118 and 122, while the remaining portions of the incoming airflow 104 that either bypass the outside of the planar redirector or travel through the openings in the planar redirector travel along the aircraft ceiling similar to the third airflow portion 126. As a variation of such an embodiment, if desired a two-plate redirector may be provided with two such plates spaced apart from each other. The upstream plate redirects a first portion of the incoming airflow downward similar to the first airflow portion 118, and permits a second portion to travel through its openings to the downstream plate. The downstream plate similarly redirects part of the second portion of the air received from the upstream plate in a downward direction, similar to the second airflow portion 122, and permits the remainder of the second portion to travel through its openings to then travel along the cabin ceiling similar to the third airflow portion 126. In such an embodiment, the downstream plate and the upstream plate need not be parallel but may be angled relative to each other, similar to the angle between the opposing surfaces 120 and 124 of the redirecting portion 112 of the redirector 102.

If desired, some embodiments permit adjustment of the angle at which the redirecting portion downwardly directs the portion of the airflow. In some such embodiments, the redirector itself is rigid but pivotally adjustable, so that the installation angle of the entire redirector 102 may be varied as needed in order to provide the desired stratification of airflows. Likewise, in the same or different embodiments, regardless of whether the entire redirector is pivotally adjustable, the redirecting portion may be pivotally adjustable relative to the dividing portion, as discussed below.

To facilitate an adjustable installation angle, in one embodiment the redirector is adjustably attachable to the existing aircraft to permit adjustment of an angle at which the redirector downwardly directs the portion of the airflow. Thus, for example, in embodiments where the redirectors are attached at their forward and aft sides to radially extending sidewall portions that define the longitudinal boundaries of each air inlet section, instead of mounting the redirectors directly to the sidewall portions, the redirectors may instead be attached to a pivotally adjustable mounting mechanism attached to each sidewall portion. Or, in embodiments in which the redirectors are attached to but spaced apart from the cabin ceiling, pivots may be provided at the points of attachment of the redirectors to the screws that attach it to the cabin ceiling.

Similarly, in another embodiment, the redirector is resiliently attachable to the existing aircraft. More particularly, in an alternative embodiment, each redirector is attached to a spring-loaded pivot mechanism that permits the rounded downstream edge 116 to resiliently pivot if a passenger's head inadvertently bumps against the downstream edge 116. Thus, for example, in embodiments where the redirectors are attached at their forward and aft sides to radially extending sidewall portions that define the longitudinal boundaries of each air inlet section, instead of mounting the redirectors directly to the sidewall portions, each side of the redirector may instead be attached to a mounting disk containing a coiled spring, which permits resilient pivotal movement of the face of the disk to which each side of the redirector is mounted. Or, in embodiments in which the redirectors are attached to but spaced apart from the cabin ceiling, resilient pivots may be provided at the points of attachment of the redirectors to the screws that attach it to the cabin ceiling. If desired, the resilient pivot mechanism may be provided as part of an adjustable-angle pivot mechanism. Alternatively, resilient attachment may also be provided in embodiments that lack adjustable attachment, and vice versa.

Figure 15:
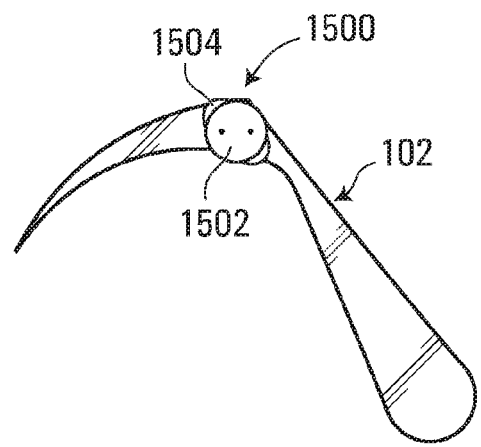
FIG. 15 is a front elevation view of the apparatus of FIG. 1 shown with an attachment mechanism.
Figure 16A:
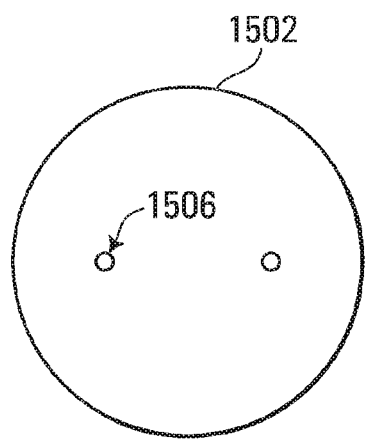
FIG. 16A is a front elevation view of a pivoting mechanism of the attachment mechanism of FIG. 15.
Figure 16B:
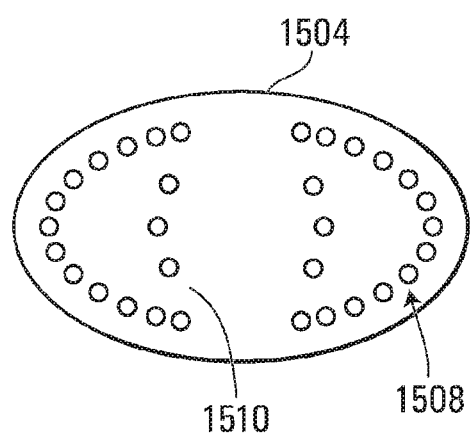
FIG. 16B is a front elevation view of a mounting plate of the attachment mechanism of FIG. 15.

Referring to FIGS. 15, 16A and 16B, an attachment mechanism for attaching the redirector 102 to an aircraft cabin is shown generally at 1500. In this embodiment, the attachment mechanism 1500 includes a resilient and adjustable attachment mechanism configured to resiliently and adjustably attach the redirector 102 to an existing aircraft to permit adjustment of an angle at which the redirector downwardly directs the first airflow portion 118 (see FIG. 6). More particularly, in this embodiment the attachment mechanism 1500 includes a pivoting mechanism 1502 and a mounting plate 1504. In this embodiment, the pivoting mechanism 1502 includes a spring-loaded disk that permits one of its faces to resiliently pivot relative to its other opposing face. In the present embodiment, the pivoting mechanism 1502 includes screwholes 1506 to accommodate screws (not shown) for rigidly mounting one face of the pivoting mechanism 1502 to a radially extending sidewall portion that defines one of the longitudinal boundaries of the air inlet section in which the redirector 102 is to be mounted. In this embodiment, the mounting plate 1504 is oblong and includes a first plurality of screwholes 1508 to accommodate screws (not shown) for attaching the mounting plate 1504 to the redirector 102, and a second plurality of screwholes 1510 to accommodate screws (not shown) for attaching the mounting plate 1504 to the pivoting mechanism 1502. To adjustably attach the mounting plate 1504 to the redirector 102, any pair of the screwholes 1508 may be selected, to thereby adjust and control the resting (normal) angle of inclination of the redirector 102. The damping force and spring rate of the spring-loaded pivoting mechanism 1502 are preferably selected to prevent or minimize movement under turbulence or ordinary operating conditions, and to permit resilient pivotal movement under larger forces, such as if bumped by a passenger for example. It will be appreciated that the depicted shapes and configurations of the components of the attachment mechanism 1500 are merely illustrative. In a further alternative embodiment, for example, the mounting plate 1504 and pivoting mechanism 1502 (and potentially the redirector itself) need not have strictly cylindrical shapes or profiles across the entire length of the redirector, but may instead possess non-planar forward and aft faces, particularly at the two points of contact between the mounting device and the curved cabin sidewall surface, such that the surface is in a sense complementary in shape to the curved cabin sidewall surface at or near the point of attachment, so as to more securely attach the redirecting device.

Either alternatively or in addition to pivotal adjustment of the entire redirector, in some embodiments the angle between the dividing portion and the redirecting portion may be varied. For example, referring to FIGS. 17A to 17D, a redirector according to a third embodiment of the invention is shown generally at 1700. In this embodiment, the redirector 1700 includes a dividing portion 1702 and a redirecting portion shown generally at 1704. More particularly, in this embodiment the redirecting portion 1704 includes a lower redirecting portion 1706 and an upper redirecting portion 1708. The dividing portion 1702 is similar to the dividing portion 110 shown in FIGS. 1-6, except that it includes an additional screwhole 1710 for pivotal attachment to the redirecting portion 1704, or more particularly for pivotal attachment to the lower and upper redirecting portions 1706 and 1708, which have respective screwholes 1712 and 1714 for accommodating the same elongated screw. In this embodiment, the upper redirecting portion 1708 includes an inward-facing protrusion 1716, which is engageable within a complementary recess 1718 of the lower redirecting portion 1706. An elongated screw (not shown) is insertable through the screwhole 1710 at the front of the dividing portion 1702, then through the screwhole 1712 at the front of the lower redirecting portion 1706, then through the screwhole 1714 of the upper redirecting portion 1708, then through the screwhole 1712 at the rear of the lower redirecting portion 1706, and finally into threaded engagement with threads (not shown) of the screwhole 1710 at the rear of the dividing portion 1702. To set a desired angle between the dividing portion and the redirecting portion, the screw is first inserted into the screwholes as described above but is only partly tightened to provide a modest but surmountable amount of friction to facilitate manual adjustment. The lower redirecting portion 1706 is then manually pivoted about the screw to the desired angle relative to the dividing portion 1702. If desired, the angle between the lower surface 120 and the upper surface 124 of the redirector 1700 may also be varied at this time, by manually pivoting the upper redirecting portion 1708 about the screw, relative to the lower redirecting portion 1706. When the desired angles of the upper and lower redirecting portions have been achieved, the screw is further tightened so that the protrusion 1716 of the upper redirecting portion 1708 is firmly squeezed and held by friction in the recess 1718 of the lower redirecting portion 1706, thereby preventing further pivotal movement of the lower and upper redirecting portions relative to the dividing portion. Thus, in this embodiment the relative angles among any of the lower and upper surfaces 120 and 124 of the redirecting portion 112, and the dividing portion 110, may be varied.

In some embodiments, regardless of whether the redirectors 102 are attached rigidly, adjustably or resiliently, the angle between the redirecting portion 112 and the dividing portion 110 may be customized at the point of manufacture to fit the proportions of the aircraft cabin.

Although specific aircraft were considered for the CFD and physical simulations described above, embodiments of the present invention are not limited to any particular brand of aircraft or to any particular type of aircraft. Thus, for example, although narrow-bodied aircraft were described above, embodiments may be equally useful for wide bodied (twin aisle) aircraft. More broadly, embodiments may also be useful for other types of transportation vehicles such as trains or buses, or for enclosed public spaces such as waiting rooms. In this regard, the results obtained and discussed above for narrow-bodied aircraft may fairly be extrapolated to other such vehicles or spaces that have top and/or side air inlets and bottom mounted air outlets.

Although each of the redirectors 102, 1302, 1310 and 1700 has been shown as a single unitary structure, alternatively, each redirector may be formed in a modular fashion by joining a plurality of prefabricated redirector sections together. For example, such sections may be joined using a resin or glue, which is preferably transparent if the redirector sections are transparent. Alternatively, the prefabricated redirector sections may be formed with interlocking complementary male and female connectors, so that the male connector of each redirector section may be inserted and locked into the female connector of an adjacent redirector section. Alternatively, other ways of joining redirector sections together may be substituted.

In addition to the embodiments described above, it is contemplated that any one or more features of any particular embodiment may be combined with any one or more features of any other embodiment, except where such features have been explicitly described as mutually exclusive alternatives.

More generally, while specific embodiments of the invention have been described and illustrated, such embodiments should be considered illustrative of the invention only and not as limiting the invention as defined by the accompanying claims.

REFERENCES

[1] K. J. Marienau, "Air Travel," 1 Aug. 2013. [Online]. Available: wwwnc.cdc.gov/travel/yellowbook/2014/chapter-6-conveyance-and-transportation-issues/air-travel.

[2] H. C. T. C. S. Olsen, "Transmission of the severe acute respiratory syndrome on aircraft," New England Journal of Medicine, pp. 2416-2422, 2003.

[3] A. T. Pavia, "Germs on a Plane: Aircraft, International Travel, and the Global Spread of Disease," Journal of Infectious Diseases, pp. 675-679, 2007.

[4] M. a. S. S. O Mohr, "Evidence for airborne infectious disease transmission in public ground transport," Robert Koch Instituye, Department of Infectious Disease Epidemiology, Berlin, 2012.

[5] CDC, "Infection Control Guidelines for Cabin Crew Members on Commercial Aircraft," 10 Mar. 2014. [Online]. Available: www.cdc.gov/quarantine/air/managing-sick-travelers/commercial-aircraft/infection-control-cabin-crew.html.

[6] W. M. Jong-Wha Lee, "Learning from SARS: Preparing for the Next Disease Outbreak: Workshop Summary—Estimating the Global Economic Costs of SARS," in Institute of Medicine (US) Forum on Microbial Threats, Washington D.C., 2004.

[7] Center for Disease Control, "Infographic: What is contact tracing?," 2014. [Online]. Available: http://www.cdc.gov/vhf/ebola/pdf/contact-tracing.pdf.
[8] J. Gupta, "Transport of expiratory droplets in an aircraft cabin," Indoor Air, vol. 21, no. 1, pp. 3-11, 2011.
[9] S. Olsen et al., "Transmission of the Severe Acute Respiratory Syndrome on Aircraft," N Engl J Med 2003; 349:2416-2422, Dec. 18, 2003, DOI: 10.1056/NEJMoa031349.
[10] T. Zhang et al., "Novel Air Distribution Systems for Commercial Aircraft Cabins," Building and Environment 42(4):1675-1684 •March 2007
[11] X.-H. Mu, "Numerical Simulation of Particulate Pollutants Transport in an Aircraft Cabin," Aeronautical Computing Technique, vol. 43, no. 5, p. 61, 2013.
[12] I. Martinez, "Aircraft Environmental Control," Polytechnic University of Madrid, Madrid, 2014.
[13] B. Jie, "Numerical Simulation on Smoke Diffusion in Aircraft Cabins," Aeronautical Computing Technique, vol. 44, no. 5, p. 1, 2014.

What is claimed is:

1. A passenger compartment of a transportation vehicle, comprising:
    a floor, opposing side walls extending from the floor, and a ceiling extending from the side walls, wherein said floor, said side walls, and said ceiling define an enclosed space;
    a plurality of rows of seats for passengers on the floor in the enclosed space;
    one or more side ventilation air inlets at an upper portion of each side wall to provide incoming airflows into the enclosed space;
    one or more ventilation air outlets at a lower portion of each side wall for receiving outgoing airflows from the enclosed space, and
    a plurality of redirector members, each said redirector member being bent-shaped in cross-section comprising an airflow dividing leg connected to an airflow redirecting leg, wherein the dividing leg and the redirecting leg of each redirector member form a generally L-shape in cross-section, wherein the dividing leg includes a pointed upstream edge and expands in profile in cross-section as it extends in the downstream direction, and wherein the redirecting leg expands in profile in cross-section as it extends in the downstream direction away from the dividing leg, each said redirector member being mounted in a different one of said one or more side ventilation air inlets to divide and stratify the incoming airflow, wherein the dividing leg is positioned in the incoming airflow to cause a first portion of the incoming airflow to flow along a lower side of the dividing leg and the redirecting leg and downwardly toward the seats and a second portion of the incoming airflow to flow along an opposite upper side of the dividing leg, wherein the redirector member cooperates with the ceiling of the cabin to divide the second portion of the incoming airflow into a portion flowing on the ceiling and a portion flowing on an opposite upper side of the redirecting leg and downwardly toward the seats to create air curtains between the seats to inhibit transmission of pathogens and disease between the passengers.

2. The passenger compartment of claim 1, wherein the passenger compartment is an aircraft cabin.

3. The passenger compartment of claim 1, further comprising one or more center ventilation air inlets in the ceiling to provide additional incoming airflows into the enclosed space, wherein the portion of the second portion of the incoming airflow flowing on the ceiling collides with the additional incoming airflows and is directed downwardly toward the seats.

4. The passenger compartment of claim 1, wherein each said redirector member is oriented to be generally parallel to the incoming airflow received at the redirector from a side ventilation air inlet.

5. The passenger compartment of claim 1, wherein the airflow dividing leg of each redirector member has a sharp upstream edge, and wherein the airflow redirecting leg of each redirector member has an enlarged rounded downstream edge.

6. The passenger compartment of claim 1, wherein the dividing leg and the redirecting leg of each redirector member are pivotally connected to enable adjustment of an angle at which the redirecting let downwardly directs airflow.

7. The passenger compartment of claim 1, further comprising light sources in the side walls or said ceiling, and wherein the redirector member is transparent or translucent to inhibit blocking of light from the light sources.

8. A method of retrofitting a ventilation system of a passenger compartment of a transportation vehicle to redirect airflow to passengers, the passenger compartment comprising: a floor, opposing side walls extending from the floor, and a ceiling extending from the side walls, wherein said floor, said side walls, and said ceiling define an enclosed space; a plurality of rows of seats for passengers on the floor in the enclosed space; one or more side ventilation air inlets at an upper portion of each side wall to provide incoming airflows into the enclosed space; one or more ventilation air outlets at a lower portion of each side wall for receiving outgoing airflows from the enclosed space, the method comprising:
    mounting a plurality of redirector members in a different one of said one or more side ventilation air inlets to divide and stratify the incoming airflow, each said redirector member being bent-shaped in cross-section comprising an airflow dividing leg connected to an airflow redirecting leg, wherein the dividing leg and the redirecting leg of each redirector member form a generally L-shape in cross-section, wherein the dividing leg includes a pointed upstream edge and expands in profile in cross-section as it extends in the downstream direction, and wherein the redirecting leg expands in profile in cross-section as it extends in the downstream direction away from the dividing leg, wherein mounting the plurality of redirector members comprises positioning the dividing leg of each redirector member in the incoming airflow in one of said one or more side ventilation air inlets to cause a first portion of the incoming airflow to flow along a lower side of the dividing leg and the redirecting leg and downwardly toward the seats and a second portion of the incoming airflow to flow along an opposite upper side of the dividing leg, and such that the redirector member cooperates with the ceiling of the cabin to divide the second portion of the incoming airflow into a portion flowing on the ceiling and a portion flowing on an opposite upper side of the redirecting leg and downwardly toward the seats to create air curtains between the seats to inhibit transmission of pathogens and disease between the passengers.

9. The method of claim 8, wherein mounting the plurality of redirector members in a different one of said one or more side ventilation air inlets comprises fixedly attaching each redirector member in a side ventilation air inlet.

10. The method of claim 8, wherein mounting the plurality of redirector members in a different one of said one or more side ventilation air inlets comprises resiliently and adjustably attaching each redirector member in a side ventilation air inlet.

11. The method of claim 8, wherein the passenger compartment is an aircraft cabin.

12. The method of claim 8, wherein the passenger compartment further comprises one or more center ventilation air inlets in the ceiling to provide additional incoming airflows into the enclosed space, wherein the portion of the second portion of the incoming airflow flowing on the ceiling collides with the additional incoming airflows and is directed downwardly toward the seats.

13. The method of claim 8, wherein each said redirector member is oriented to be generally parallel to the incoming airflow received at the redirector from a side ventilation air inlet.

14. The method of claim 8, wherein the airflow dividing leg of each redirector member has a sharp upstream edge, and wherein the airflow redirecting leg of each redirector member has an enlarged rounded downstream edge.

15. The method of claim 8, wherein the dividing leg and the redirecting leg of each redirector member are pivotally connected to enable adjustment of an angle at which the redirecting let downwardly directs airflow.

16. The method of claim 8, further comprising light sources in the side walls or said ceiling, and wherein the redirector member is transparent or translucent to inhibit blocking of light from the light sources.

17. A passenger compartment of a transportation vehicle, comprising:
a floor, opposing side walls extending from the floor, and a ceiling extending from the side walls, wherein said floor, said side walls, and said ceiling define an enclosed space;
a plurality of rows of seats for passengers on the floor in the enclosed space;
one or more side ventilation air inlets at an upper portion of each side wall to provide incoming airflows into the enclosed space;
one or more center ventilation air inlets in the ceiling to provide additional incoming airflows into the enclosed space;
one or more ventilation air outlets at a lower portion of each side wall for receiving outgoing airflows from the enclosed space, and
a plurality of redirector members mounted on the ceiling parallel to the one or more side ventilation air inlets, each redirector member being generally L-shaped in cross-section comprising an airflow dividing leg connected to an airflow redirecting leg, wherein the dividing leg includes a pointed upstream edge and expands in profile in cross-section as it extends in the downstream direction, and wherein the redirecting leg expands in profile in cross-section as it extends in the downstream direction away from the dividing leg, and wherein each redirector member is configured to cause incoming airflows from the one or more side ventilation air inlets and the center ventilation air inlets to flow downwardly toward the seats to create air curtains between the seats to inhibit transmission of pathogens and disease between the passengers.

18. The passenger compartment of claim 17, wherein the plurality of redirector members includes on both sides of the passenger compartment a first redirector member and a second redirector member mounted on the ceiling in a parallel arrangement.

19. The passenger compartment of claim 18, wherein each row of seats includes a window seat, an aisle seat, and a middle seat between said window seat and the aisle seat, wherein the first redirector member is mounted at a location on the ceiling between the window seat and the middle seat, and wherein the second redirector member is mounted at a location on the ceiling between the middle seat and the aisle seat.

20. The passenger compartment of claim 17, wherein each redirector member comprises curved opposing outside and inside sidewalls and a planar bottom surface.

* * * * *